United States Patent
Baszucki

(10) Patent No.: US 10,737,184 B2
(45) Date of Patent: Aug. 11, 2020

(54) USER-GENERATED CONTENT SYSTEM FOR THE CREATION OF FRIENDS

(71) Applicant: Roblox Corporation, San Mateo, CA (US)

(72) Inventor: David B. Baszucki, Portola Valley, CA (US)

(73) Assignee: Roblox Corporation, San Mateo, CA (US)

( * ) Notice: Subject to any disclaimer, the term of this patent is extended or adjusted under 35 U.S.C. 154(b) by 31 days.

(21) Appl. No.: 16/127,842

(22) Filed: Sep. 11, 2018

(65) Prior Publication Data

US 2020/0078690 A1 Mar. 12, 2020

(51) Int. Cl.
*A63F 9/24* (2006.01)
*A63F 13/87* (2014.01)

(52) U.S. Cl.
CPC .................................. *A63F 13/87* (2014.09)

(58) Field of Classification Search
CPC ....... G06Q 50/01; A63F 13/63; A63F 13/795; A63F 13/87; A63F 2300/556; A63F 2300/5566; A63F 2300/6018
See application file for complete search history.

(56) References Cited

U.S. PATENT DOCUMENTS

| | | | |
|---|---|---|---|
| 2012/0088579 A1* | 4/2012 | Youm | A63F 13/497 463/29 |
| 2013/0268369 A1* | 10/2013 | McMaster | G06Q 30/01 705/14.66 |
| 2015/0094139 A1 | 4/2015 | Kargar | |
| 2017/0173476 A1 | 6/2017 | Deskiewicz et al. | |
| 2017/0266564 A1 | 9/2017 | Choudhuri | |

OTHER PUBLICATIONS

"International Search Report and Written Opinion in International Application No. PCT/US19/50418", dated Nov. 29, 2019, 8 pages.

* cited by examiner

*Primary Examiner* — Lawrence S Galka
(74) *Attorney, Agent, or Firm* — IP Spring

(57) ABSTRACT

A method and system hosts a game on a collaboration platform to allow playing users to participate in gameplay of the game. The method and system identify a condition of the game that is specified by the creating user of the game and identifies first social interaction criteria for the plurality of playing user. Satisfaction of the condition qualities at least one of the playing users to receive a friend request. The method and system determine that a first social interaction between a first playing user and a second playing user of the plurality of playing users playing the game satisfies the condition of the game. The method and system send the friend request to a first client device of the first playing user inviting the first playing user to establish a friendship with the second playing user on the collaboration platform.

25 Claims, 9 Drawing Sheets

USER-GENERATED CONTENT SYSTEM FOR THE CREATION OF FRIENDS

TECHNICAL FIELD

This disclosure relates to the field of user-generated content (UGC) platforms and, in particular, to establishing friendships on user-generated content platforms using user-generated social interaction conditions.

BACKGROUND

User-generated content platforms allow users to connect to and share information with each other via the Internet. Users of user-generated content platform, such as a gaming platform, may participate in multiplayer gaming environments, design custom gaming environments, decorate avatars, or exchange virtual items with other users, and so forth.

DESCRIPTION OF DRAWINGS

Various implementations of the disclosure will be understood more fully from the detailed description given below and from the accompanying drawings of various implementations of the disclosure.

DETAILED DESCRIPTION

Figure 1:
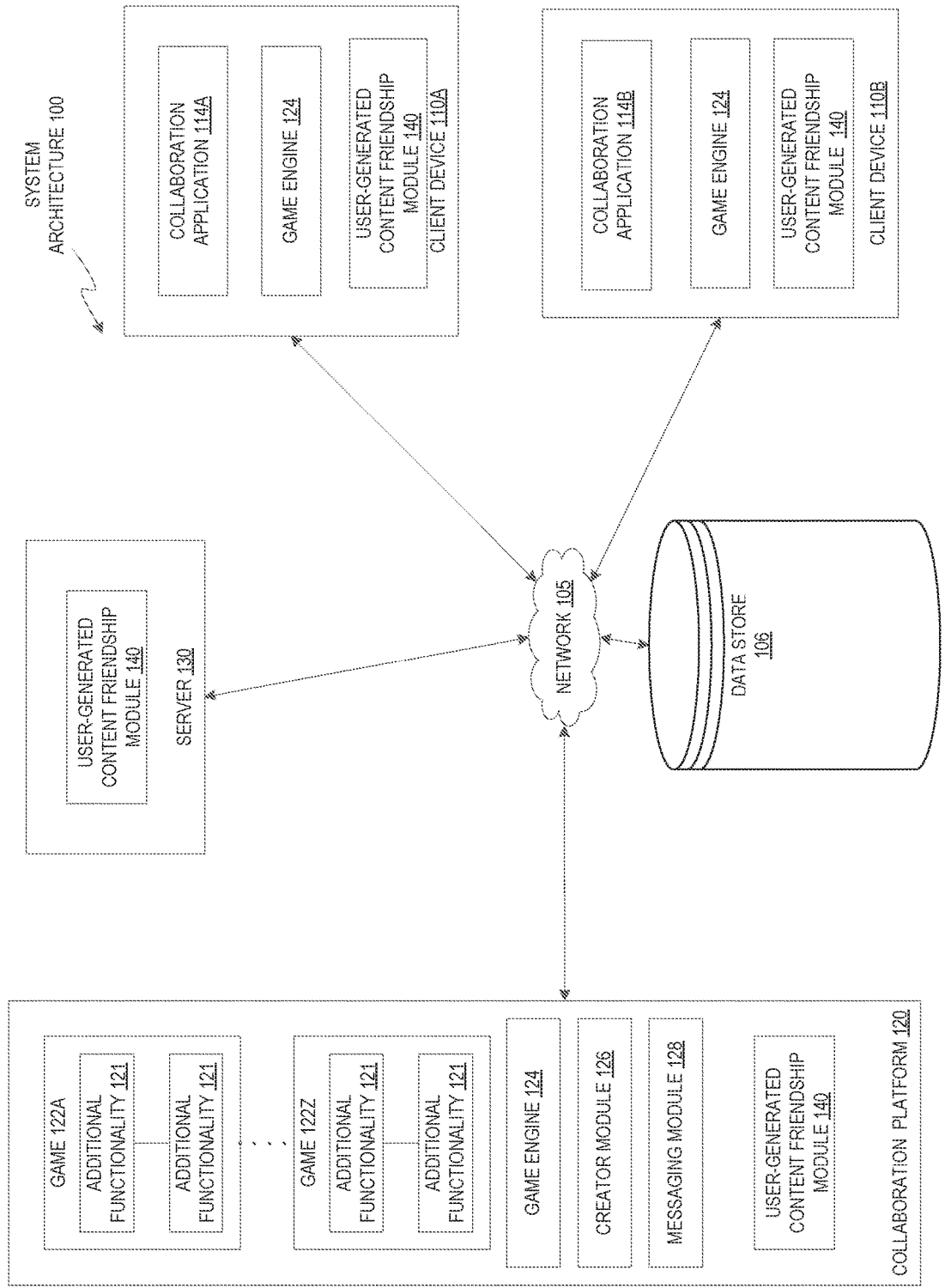
FIG. 1 illustrates an example system architecture, in accordance with implementations of the disclosure.

Collaboration platforms (also referred to as "user-generated content platforms" or "user-generated content systems" herein), such as gaming platforms, offer a variety of ways for users to interact with one another. For example, users of a gaming platform may work together towards a common goal, share various virtual gaming items, send electronic messages to one another, and so forth. Users (e.g., playing users) of a collaboration platform may play games as characters or avatars. A collaboration platform may also allow users (e.g., creating users) of the platform to create content for the platform that may be consumed by playing users of the platform. For example, creating users of the collaboration platform may create game specifications with developmental tools and publish the created games using the game specifications.

In some systems, a playing user may make a "friend" with another playing user by sending a friend request to the other playing user. If the other playing user accepts the friend request, the two playing users become friends on the systems. In some systems, friends may have access to one another's account information, while non-friends are blocked from accessing one another's account information.

In some systems, friend suggestions may be provided by the system to a playing user. The friend suggestions may suggest one or more other users with whom the playing user may be interested in becoming friends. The systems may use various techniques to determine friend suggestions, but the techniques may not be determined or specified by users of the systems. Additionally, the techniques may not be effective in suggesting friends with whom a user wants to establish friendships. Further, the techniques may not be effectively applied to other systems.

Aspects of the disclosure address the above-mentioned and other challenges by implementing crowdsourcing techniques in the creation of friends and friend requests on a collaboration platform. A creating user may develop a game specification that allows a collaboration platform to host a corresponding game and allow playing users to participate in gameplay of the game. The creating users can specify conditions of social interaction for the game that identify social interaction criteria. Pursuant to the conditions, the collaboration platform (or game) may monitor for social interaction events between playing users within the game environment of the game during gameplay or outside of the game environment but on the collaboration platform. The satisfaction of the condition by in-game events (e.g., in-game social interactions) between characters or by global events (e.g., in-platform social interaction but outside the game environment of the game) between characters (or playing users) can qualify the playing users to receive friend requests to establish friendships.

In some implementations, subsequent to establishing a friendship using the user-generated conditions, the established friendship may be monitored to determine whether the friendship satisfies a quality friendship threshold. In some implementations, the creating user may be recognized for establishing quality friendships and punitive actions may be taken for establishing non-quality friendships. In some implementations, additional feedback may be provided to the creating users to inform the creating users about the performance of the user-generated conditions, the associated friend requests, and the established friendships. The feedback may be used by the creating users to improve or modify the user-generated conditions that qualify playing users to receive friend requests.

In some implementations, a developer interface is provided to a creating user that allows the creating user to create a game specification for a game or to specify a condition (e.g., social interaction condition) for the game. The condition identifies social interaction criteria for the game. The satisfaction of the condition qualifies at least one playing user to receive a friend request. The collaboration platform may receive the game specification created by the creating user using the developer interface and the condition selected by the creating user.

In some implementations, the collaboration platform may host the game to allow playing users to participate in gameplay of the game. The collaboration platform may identify a condition that is specified by a creating user of the game and identifies social interaction criteria for playing users of the game. The satisfaction of the social interaction criteria of the condition qualifies at least one of the playing users to receive a friend request. The collaboration platform or game may monitor the game environment to identify in-game events indicative of social interactions that satisfy the condition of the game. The collaboration platform (or the game) may monitor global events on the collaboration platform to identify events that are outside the game environment but on the collaboration platform and that satisfy the condition of the game. Responsive to identifying that the condition has been satisfied, the collaboration platform or game may send a friend request to a playing user whose social interactions with another playing user satisfied the condition.

In implementations, the collaboration platform may monitor the established friendship to determine whether the friendship satisfies a quality friendship threshold. If the friendship is determined to satisfy the quality friendship threshold, the collaboration platform may recognize the creating user by, for example, promoting the game in search results or promoting other games from the same creating user in search results. If the friendship is determined to not satisfy the quality friendship threshold (e.g., non-quality friendship), collaboration platform may perform a punitive action with respect to the creating user, such as reducing a ranking of the game that negatively influences the appearance of the game in search results.

In some implementations, the collaboration platform may provide the creating user with a dashboard that presents information to the creating user indicative of the friend requests sent and friendships established using the user-generated conditions. The dashboard may provide feedback to the creating user to help the creating user in evaluating the creating user's user-generated conditions in establishing friendships.

In some implementations, a game for gameplay may be provided. For example, the game may be hosted by a game server associated with a creating user. In another example, the collaboration platform may host the game. In both examples, the game is accessible by playing users via the collaboration platform. The game is associated with a condition that identifies social interaction criteria for the playing users playing the game. Satisfaction of the condition qualifies at least one of the playing users to receive a friend request. The system monitors for an event identifier indicative of a social interaction between a first playing user and a second playing user of the playing users that are participating in the gameplay of the game. The event identifiers are indicative of a social interaction between playing users that are participating in the gameplay of the game. The game, based on the event identifiers, determines whether the social interaction between the first playing user and the second playing user satisfies the condition. Responsive to determining that the social interaction between the first playing user and the second playing user satisfies the condition, the game causes the friend request to be sent to at least the first client device of the playing user inviting the first playing user to establish a friendship with the second playing user on the collaboration platform or on the game. In one implementation, the game may send the friend request to the first playing user. In another implementation, the game may send an indication to the collaboration platform (via a friending API) requesting the collaboration platform to send the friend request to the first playing user.

In some implementations, monitoring for the event identifier indicative of the first social interaction between the first playing user and the second playing user of the plurality of users that are participating in the gameplay of the game includes monitoring a game environment associated with the game for an identifier of an in-game invent indicative of social interaction between the playing users within the game environment.

In some implementations, monitoring for the event identifier indicative of the first social interaction between the first playing user and the second playing user of the plurality of users that are participating in the gameplay of the game includes may include receiving, from the collaboration platform, an identifier of a global event indicative of social interaction between the first playing user and the second playing user outside the game environment of game and on the collaboration platform. For example, the game or game server may use an application programming interface (API) to request and receive information, such as global event identifiers, from the collaboration platform that indicate social interaction between the first playing user and the second playing user outside the game environment of game and on the collaboration platform.

Accordingly, aspects of the disclosure provide creating users the ability to specify and create conditions of social interaction with respect to a particular game that responsive to being satisfied, cause friend requests to be sent to playing users, which allow the playing user to establish friendships on the collaboration platform. In particular, the aforementioned addresses technological challenges and improves the process of using and providing crowd-sourcing tools to determine and establish friendships on a collaboration platform. For example, suggesting friendships on a platform using aspects of the present disclosure creates a system where users are more likely to become friends and establish quality friendships on a collaboration platform or a game. In another example, users are given tools that allow the users to actively participate in the identification of users that may receive friend requests. In another example, suggesting friendships on a platform using aspects of the present disclosure allow users to tailor the conditions under which friend suggestions are generated. The aforementioned also improves the operation of a computer or computer network at least by distributing computational intensive operations (e.g., computer processing operations, computer storage operations, etc.) among client devices and the collaboration platform (e.g., server devices). Distributing the computational operations reduces the computational operations that are performed by the collaboration platform and frees computational resources (e.g., computer processing resources, computer storage resources, etc.) of the collaboration platform for other tasks. For example, game specification creation and social interaction condition creation may be performed by client devices using the computational resources of the client device, rather than the computational resources of the collaboration platform. Additionally, data related to the creation of game specification and conditions may be stored on client devices prior to upload reducing storage overhead of the collaboration platform.

It may be noted that a collaboration platform described as a gaming platform herein is provided for purposes of illustration, rather than limitation. A collaboration platform may be one or more of numerous platforms, such as a gaming platform, a social networking platform, a purchasing platform, a messaging platform, a creation platform, and so forth. It may be further noted that aspects of the disclosure are illustrated using an example of a gaming platform and games for purposes of illustration, rather than limitation. Aspects of the present disclosure may be applied to various platforms.

FIG. 1 illustrates an example system architecture 100, in accordance with implementations of the disclosure. The system architecture 100 (also referred to as "system" herein) includes client devices 110A and 110B (generally referred to as "client device(s) 110" herein), a network 105, a data store 106, a collaboration platform 120, and a server 130. It may be noted that system architecture 100 is provided for illustration, rather than limitation. In implementations, the system architecture 100 may include the same, fewer, more, or different elements configured in the same or different manner.

In one implementation, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In implementations, the server 130 may be one or more computing devices (e.g., a rackmount server, a server computer, cluster of physical servers, etc.). In implementations, the server 130 may be included in the collaboration platform 120, be an independent system, or be part of another system or platform. The server 130 may include user-generated content friendship module 140.

In some implementations, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the collaboration platform 120 and to provide a user with access to collaboration platform 120. The collaboration platform 120 may also include a website (e.g., a webpage) or application back-end software that may be used to provide a user with access to content provided by collaboration platform 120. For example, users may access collaboration platform 120 using collaboration application 114 on client devices 110. It may be noted that collaboration application 114A and 114B may generally referred to as collaboration application(s) 114 herein. In some implementations, collaboration application 114 may be two instances of the same application.

In implementations, collaboration platform 120 may be a type of social network providing connections between users or a type of user-generated content system that allows users (e.g., end-users or consumers) to create content for the platform, where the created content may also be consumed by other users of the system. In implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In one implementation, collaboration platform 120 may be a gaming platform, such as an online gaming platform or a virtual gaming platform. For example, the gaming platform may provide single-player or multiplayer games to a community of users that may access or interact with the games 122A-122Z using client devices 110 via network 105. In implementations, games 122 (also referred to as "video game," "online game," or "virtual game" herein) may be two-dimensional (2D) games, three-dimensional (3D) games (e.g., 3D user-generated games using creator module 126), virtual reality (VR) games, or augmented reality (AR) games, for example. In implementations, users, such as playing users may participate in gameplay with other playing users. In implementations, a game 122 may be played in real-time with other users of the game 122.

In implementations, gameplay may refer to interaction of one or more players with a game environment or the presentation of the interaction on a display of a client device. In implementations, real-time or live gameplay may refer to the broadcast, presentation, or display of gameplay as the gameplay occurs, rather than past or recorded gameplay. For example, real-time gameplay may be displayed on a display of a client device 110 substantially concurrent with user interaction with a game environment (at least within the technical limitations of displaying real-time action, e.g., the user interaction with the game may be displayed within milliseconds of user input and may appear to the user as if in absolute real-time). A game environment may refer to elements of gameplay, an environment or space in which the gameplay can be presented or rendered, or the space in which a character or avatar can interact. Parts of the game environment may be visible to a player user (e.g., the view of the playing user), while other parts of the gaming environment may not be visible to a player user (e.g., elements outside the view of the playing user). The game environment may be defined by game rules or game logic (e.g., game specification) and rendered for consumption by playing users.

In implementations, a view of the gameplay may be presented on the client device 110. The views on different client devices 110 may be the same or different. In implementations, a view (also referred to as "field of view" herein) may refer to the extent of the observable game world that may be seen at any given moment from the perspective of a game camera and that is presented in the display of a client device. For example, the view of the game camera may be from a first-person perspective or a third-person perspective or some combination thereof.

In some implementations, a game 122 can be defined by a game specification. A game specification may include an electronic file that can be executed or loaded using software, firmware or hardware configured to present the game content (e.g., digital media item) to an entity. In implementations, a game specification of a game 122 may be executed and rendered using a game engine 124. In some implementations, a game specification of a game 122 may define a common set of rules or common goal, and define the game environment(s) of a game 122 share the common set of rules or common goal. In implementations, different games may have different rules or goals from one another.

In some implementations, games may have one or more environments (also referred to as "game environments" or "virtual environments" herein) where multiple game environments may be linked. An example of a game environment may be a three-dimensional (3D) game environment. The one or more game environments of a game 122 may be collectively referred to a "world" or "gaming world" or "virtual world" or "universe" herein. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, collaboration platform 120 hosts games 122 and allows users to interact with the games 122 using collaboration application 114 of client devices 110. Users of collaboration platform 120 may play, create, interact with, or build games 122, or create and build objects (e.g., also referred to as "item(s)" or "game objects" or "virtual game item(s)" herein) of games 122. For example, in generating user-generated virtual items, users may create characters, decoration for the characters, one or more virtual environments for an interactive game, or build structures used in a game 122, among others. In implementations, users may buy, sell, or trade game virtual game objects, such as in-platform currency (e.g., virtual currency), with other users of the collaboration platform 120. In implementations, collaboration platform 120 may transmit game content to collaboration applications 114. In implementations, game content (also referred to as "content" herein) may refer to any data or software instructions (e.g., game objects, game, user information, video, images, commands, media item, etc.) associated with collaboration platform 120 or collaboration applications 114. In implementations, game objects (e.g., also referred to as "item(s)" or "objects" or "virtual game item(s)" herein) may refer to objects that are used, created, shared or otherwise depicted in games 122 of the collaboration platform 120. For example, game objects may include a part, model, character, tools, weapons, clothing, buildings, vehicles, currency, flora, fauna, components of the aforementioned (e.g., windows of a building), and so forth.

It may be noted that collaboration platform 120 hosting games 122, is provided for purposes of illustration, rather than limitation. In some implementations, a sever outside of collaboration platform 120 may host one or more games 122. In some implementations, collaboration platform 120 may host one or more media items. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity.

In some implementations, a game 122 may be associated with a particular user or a particular group of users (e.g., a private game), or made widely available to users of the collaboration platform 120 (e.g., a public game). In implementations, where collaboration platform 120 associates one or more games 122 with a specific user or group of users, collaboration platform 120 may associated the specific user (s) with a game 122 using user account information (e.g., a user account identifier such as username and password).

In some implementations, collaboration platform 120 or client devices 110 may include a game engine 124. In implementations, game engine 124 may be used for the development or execution of games 122. For example, game engine 124 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 124 may generate commands that help compute and render the game (e.g., rendering commands, collision commands, physics commands, etc.) In some implementations, game engine 124 of client devices 110 may work independently, in collaboration with game engine 124 of collaboration platform 120, or a combination of both.

In some implementations, both the collaboration platform 120 and client device 110 execute a game engine 124. The collaboration platform 120 using game engine 124 may perform some or all the game engine functions (e.g., generate physics commands, rendering commands, etc.), or offload some or all the game engine functions to game engine 124 of client device 110. In some implementations, each game 122 may have a different ratio between the game engine functions that are performed on the collaboration platform 120 and the game engine functions that are performed on the client device 110. For example, the game engine 124 of the collaboration platform 120 may be used to generate physics commands in cases where there is a collision between at least two game objects, while the additional game engine functionality (e.g., generate rendering commands) may be offloaded to the client device 110. In some implementations, the ratio of game engine functions performed on the collaboration platform 120 and client device 110 may be changed (e.g., dynamically) based on gameplay conditions. For example, if the number of users participating in gameplay of a particular game 122 exceeds a threshold number, the collaboration platform 120 may perform one or more game engine functions that were previously performed by client device 110.

For example, playing users may be playing a game 122 on client devices 110 and may send control instructions (e.g., user inputs, such as right, left, up, down, user election, or character position and velocity information, etc.) to collaboration platform 120. Subsequent to receiving control instructions from the client devices 110, collaboration platform 120 may send gameplay instructions (e.g., position and velocity information of the characters participating in the group gameplay or commands, such as rendering commands, collision commands, etc.) to the client devices 110 based on control instructions. For instance, the collaboration platform 120 may perform one or more logical operations (e.g., using game engine 124) on the control instructions to generate gameplay instruction for the client device 110. In other instances, collaboration platform 120 may pass one or more or the control instructions from one client device 110 to other client devices participating in the game 122. The client devices 110 may use the gameplay instructions and render the gameplay for presentation on the displays of client devices 110.

In implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In implementations, the control instructions are sent directly to the collaboration platform 120. In other implementations, the control instruction may be sent from a client device 110A to another client device 110B, where the other client device 110B generates gameplay instructions using the local game engine 124.

In implementations, gameplay instructions may refer to instructions that allow a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In implementations, collaboration platform 120 may include a creator module 126. In implementations, creator module 126 may allow users of the collaboration platform 120 to become creating user that design or create environments in an existing game 122, create new games, or create new game objects within games or environments. For example, a creating user may create a game specification for a game where the game specification is sent to the collaboration platform 120 so that the collaboration platform 120 can host the particular game.

In implementations, creator module 126 may allow a user to create, modify, or customize characters. In implementations, characters (or game objects generally) are constructed from components, one or more of which may be selected by the user, that automatically join together to aid the user in editing. One or more characters (also referred to as an "avatar" or "model" herein) may be associated with a user (also referred to as a "playing user" herein) where the user may control the character to facilitate a user's interaction with the game 122. In implementations, a character may include components such as body parts (e.g., hair, arms, legs, etc.) and accessories (e.g., t-shirt, glasses, decorative images, tools, etc.). In implementations, body parts of characters that are customizable include head type, body part types (arms, legs, torso, and hands), face types, hair types, and skin types, among others. In implementations, the accessories that are customizable include clothing (e.g., shirts, pants, hats, shoes, glasses, etc.), weapons, or other tools. In implementations, the user may also control the scale (e.g., height, width, or depth) of a character or the scale of components of a character. In implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In implementations, creator module 126 may publish a user's character for view or use by other users of collaboration platform 120. In some implementations, creating, modifying, or customizing characters, other game objects, games 122, or game environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In implementations, collaboration platform 120 may store characters created by users in data store 106. In implementations, the collaboration platform 120 maintains a character catalog and game catalog that may be presented to users via collaboration application 114. A user may select a game 122 from the game catalog to play. In implementations, the game catalog includes images of games stored on collaboration platform 120. In addition, a user may select a character (created by the playing user or other user) from the character catalog to participate in the chosen game. The character catalog includes images of characters stored on the collaboration platform 120. In implementations, one or more of the characters in the character catalog may have been created or customized by the user. In implementations, the chosen character may have character settings defining one or more of the components of the character.

In implementations, a user's character includes a configuration of components, where the configuration and appearance of components and more generally the appearance of the character may be defined by character settings. In implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by collaboration platform 120.

In implementations, collaboration platform 120 executing creator module 126 includes a user-interfacing website or application (e.g., collaboration application 114) where users (also referred to as "creating users," "creators," "owners," or "owning users" herein) may access online computational resources (e.g., cloud resources) hosted by collaboration platform 120 for the purposes of building, administrating, editing, and interacting with personally owned games 122 or gaming environments. For example, creating module may provide a user interface and APIs so that creating users can access game content, game engines, as well as other resources and tools maintained by collaboration platform 120. In implementations, creator module 126 includes tools available to users for creating and instantiating three-dimensional virtual games or environments. In implementations, creator module 126 is available to users that wish to create and administer their own private virtual game 122. In implementations, a user may access creator module 126 using collaboration application 114. In implementations, creator module 126 may use a user interface (also referred to as a "developer interface" herein) via collaboration application 114 to allow users access the functionality of creator module 126. In implementations, the developer interface may be part of collaboration application 114. For example, a developer interface of collaboration application 114 may allow a user access to a library of game objects that may be selected by the user to build a game environment or build a game 122. The user may publish their game objects via the developer interface so that the game is available to users of collaboration platform 120.

In implementations, creator module 126 may provide control of created games 122 and environments to creating users who may set administrative policy regarding which users will be allowed to interact with the created game 122 or environment and which users have the capability of modifying, editing, or interacting with the game 122 or environment. Users with administrative control may also be referred to as administrative users herein, unless otherwise specified. In some implementations, administrative rules can be granular to the point of specifying various levels of interaction, modification, or editing capabilities for certain individuals who might be recruited or otherwise desire to interact with the game 122 or gaming environment. For example, individuals may be recruited from friends in collaboration platform 120 or friends from social networks or in other group associated online venues. In implementations, creator module 126 has administrative tools for setting such policies including or in addition to general rules for interaction within the game 122 or gaming environment.

In implementations, the client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 via collaboration application 114 may connect to collaboration platform 120 at any given moment. It may be noted that the number of client devices 110 is provided as illustration, rather than limitation. In implementations, any number of client devices 110 may be used.

In implementations, each client device 110 may include an instance of collaboration application 114. In one implementation, the collaboration application 114 may be an application that allows users to use and interact with collaboration platform 120, such as control a virtual character in a virtual game hosted by collaboration platform 120, or view or upload content, such as games 122, images, video items, web pages, documents, and so forth. In one example, the collaboration application 114 may be a web application (e.g., an application that operates in conjunction with a web browser) that can access, retrieve, present, or navigate content (e.g., virtual character in a virtual environment, etc.) served by a web server. In another example, collaboration application 114 may be a native application (e.g., a mobile application, app, or a gaming program) that is installed and executes local to client device 110 and allows users to interact with collaboration platform 120. The collaboration application 114 may render, display, or present the content (e.g., a web page, a media viewer) to a user. In an implementation, the collaboration application 114 may also include an embedded media player (e.g., a Flash® player) that is embedded in a web page.

According to aspects of the disclosure, the collaboration application 114 may be a collaboration platform application for users to build, create, edit, upload content to the collaboration platform 120 as well as interact with collaboration platform 120 (e.g., play games 122 hosted by collaboration platform 120). As such, the collaboration applications 114 may be provided to the client devices 110A and 110B by the server 130 or collaboration platform 120. In another example, the collaboration applications 114 may be applications that are downloaded from the server 130. In some implementations, collaboration application 114 of client device 110 may include game engine 124. In some implementations, game engine 124 of client device 110 may be separate from collaboration application 114.

In implementations, a user may login to collaboration platform 120 via collaboration application 114. The user may access a user account by providing user account information (e.g., username and password) where the user account is associated with one or more characters available to participate in one or more games 122 of collaboration platform 120.

In general, functions described in one implementation as being performed by the collaboration platform 120 can also be performed by the client devices 110A through 110B, or server 130, in other implementations if appropriate. In addition, the functionality attributed to a particular component can be performed by different or multiple components operating together. The collaboration platform 120 can also be accessed as a service provided to other systems or devices through appropriate application programming interfaces (APIs), and thus is not limited to use in websites.

In implementations, collaboration platform 120 may include messaging module 128. In implementations, messaging module 128 may be a system, application, or module that allows users to exchange electronic messages via a communication system, such as network 105. Messaging module 128 may be associated with collaboration application 114 (e.g., module of collaboration application 114 or be a separate application). In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination thereof, among others.

In implementations, messaging module 128 may facilitate the exchange of electronic messages between users. For example, a user may be logged into a messaging application on client device 110A, and another user may be logged into a messaging application on client device 110B. The two users may start a conversation, such as an instant messaging conversation. Messaging module 128 may help facilitate the messaging conversation by sending and receiving the electronic messages between the users of collaboration platform 120. In another implementation, two users may use respective messaging applications to participate in in-game dialog with one another where the dialog may be part of the view that includes the gameplay.

In implementations, users of a collaboration platform 120 may be linked to other users and be recognized by the collaboration platform 120 as "friends." A "friend" on the collaboration platform 120 may refer to a connection to another user via the collaboration platform 120. "Friendship" may refer the connection between at least two users via the collaboration platform 120. In some implementations, a user and their friends may have special access to one another such as the ability to see information about a friend's user account, send electronic messages to one another, trade items, as well as others. In some implementations, establishing friendships may be performed by sending a friend request to another user and having the other user accept the friend request to establish the friendship. A friend request may be a message (or alternative) sent to a user requesting that the user establish a friendship with another user on the collaboration platform 120.

In some implementations, users of collaboration platform 120 may have base functionalities to interact with other users of collaboration platform 120. By establishing a friendship with another user, a user may be allowed to access additional functionalities (also referred to as "privileges" or "additional privileges" herein) of the collaboration platform 120 that allow the friends greater opportunity to interact with one another. In some implementations, users of collaboration platform 120 that are friends may be able to use the base functionalities and the additional functionalities in response to establishing a friendship.

In some implementations, the additional functionality may include messaging functionality that allows user A (e.g., user of client device 110A) and user B (e.g., user of client device 110B) to communicate using a messaging service (e.g., messaging module 128) via the collaboration platform 120 (e.g., posts, chats, personal messages, public messages, messaging in a virtual gaming environment, video, etc.). For example, the messaging functionality may allow users to transmit messages to each other. In another example, the messaging functionality allows users to transmit certain types of information (e.g., sensitive information, contact information, name, picture, voice recording, current location, unique identifiers (device ID), etc.) to each other that would otherwise be filtered by messaging module 128. It may be noted that user A and user B are used for purposes of illustration, rather than limitation. For example, collaboration platform 120 may include one or more users capable of establishing friendships that cause collaboration platform 120 to grant additional functionality.

In some implementations, an additional functionality may include a sharing functionality that allows user A and user B to share items with each other via the collaboration platform 120. For example, users of a gaming platform may have a sharing functionality that allows users to purchase, trade, or transfer virtual items, such as virtual currency, in a virtual gaming environment.

In some implementations, an additional functionality may include a following functionality that allows user A and user B to follow each other into a game 122 or into a specific gaming environment of a game 122 hosted by the collaboration platform 120. For example, user A may be participating in a game 122A. The following functionality may allow user B to navigate to a profile page of user A and select an option, "Join Game," on user A's profile page, which places user B in the game 122A (e.g., the specific gaming environment of game 122A where user A is participating). In implementations, the following functionality may also include a notification feature that for example, notifies user B of the game in which user A has moved or is currently participating.

In some implementations, an additional functionality may include an invitation functionality that allows user A and user B to invite each other to a private game hosted by the collaboration platform 120. For example, user A may create a private game and the invitation functionality may allow user A to invite user B to participate in the private game.

In some implementations, an additional functionality may include a group functionality that allows user A and user B to join a group hosted by the collaboration platform 120. For example, the additional functionality may allow user A to invite user B to a group where user A is a group member or group creator. Members of a group may participate with each other to compete against a different group in a game 122, may participate with each other in building (e.g., environments, structures, etc.) within a game 122, may participate with each other to create a game 122 (e.g., via creator module 126), etc.

In some implementations, an additional functionality includes an interaction functionality that allows user A and user B to interact with each other via the collaboration platform 120. For example, the base functionality may allow a user to participate in single-player games (but not multi-player games) and the interaction functionality may allow the user to participate in multi-player games. In another example, the base functionality may allow user A to compete against other users in a game 122 and the interaction functionality may allow user A to work together with user B to compete against other users in a game 122. It may be noted that the additional functionalities described herein are provided for purposes of illustration, rather than limitation. In other implementations, other features of collaboration platform 120 may be included in the additional functionalities that are provided in view of establishing a friendship.

For the sake of illustration, rather than limitation, user-generated content friendship module 140 is described as implemented on collaboration platform 120. In other implementations, user-generated content friendship module 140 may in part or wholly be implemented on server 130. In other implementations, user-generated content friendship module 140 may in part or wholly be implemented on client devices 110. In other implementations, user-generated content friendship module 140 operating on one or more of client device 110, server 130, or collaboration platform 120 may work in conjunction to perform the operations described herein. Although implementations of the disclosure are discussed in terms of collaboration platforms, implementations may also be generally applied to any type of platform providing connections between users or user-generated content. The user-generated content friendship module 140 may help facilitate the operations described herein, such as operations described with respect to FIG. 2 through FIG. 7. In some implementations, the user-generated content friendship module 140 may part of another application (e.g., collaboration application 114), such as a plug-in. In some implementations, user-generated content friendship module 140 may be a separate application executing on a device.

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2A:
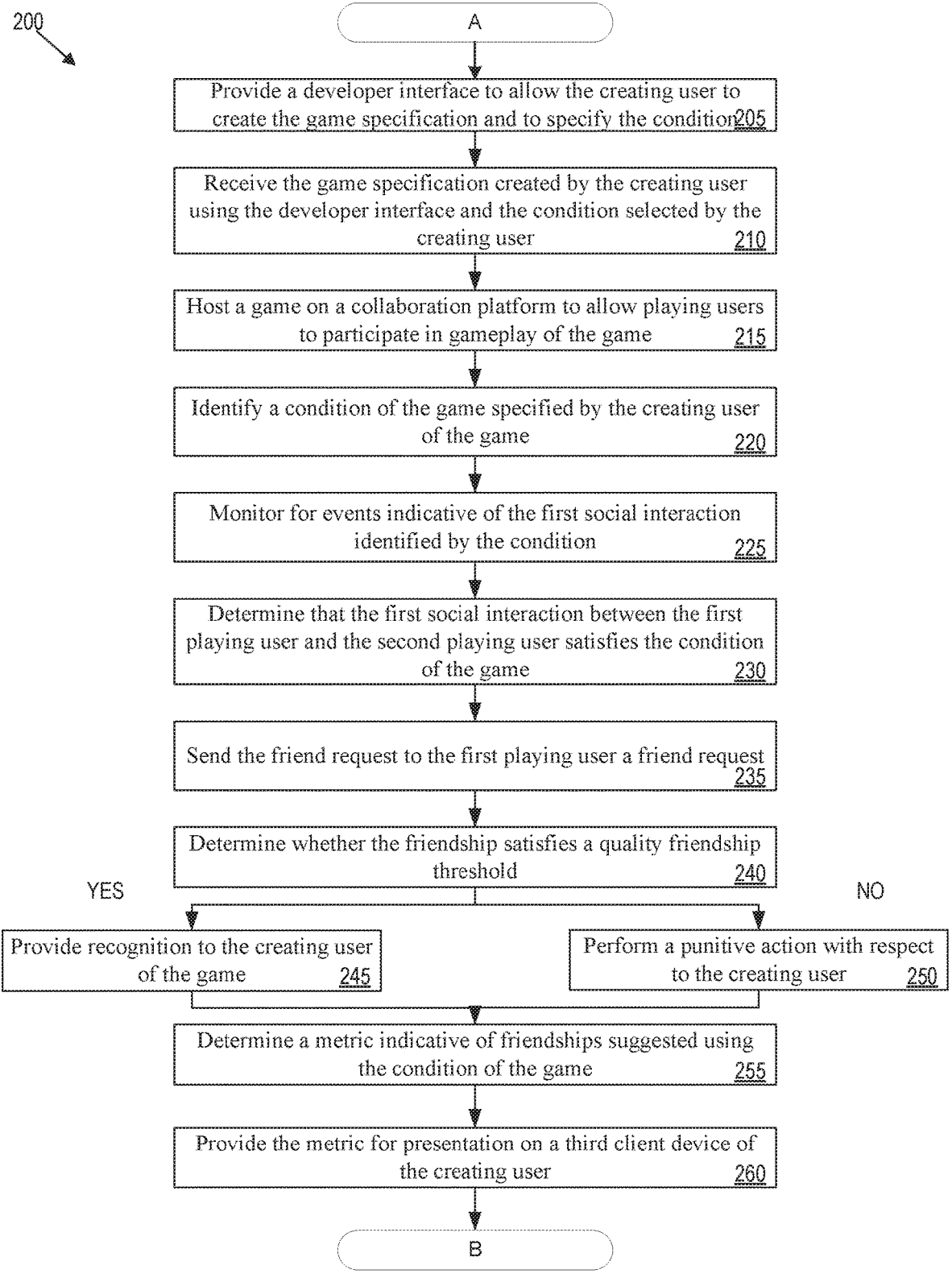
FIG. 2A is a flow diagram illustrating a method for establishing friendships on a collaboration platform, in accordance with implementations of the disclosure.

FIG. 2A is a flow diagram illustrating method 200 for establishing friendships on a collaboration platform, in accordance with implementations of the disclosure. Method 200 may be performed by processing logic that includes hardware (e.g., circuitry, dedicated logic, programmable logic, microcode), software (e.g., instructions run on a processing device to perform hardware simulation), or a combination thereof. In some implementations, user-generated content friendship module 140 executing at collaboration platform 120 may perform some or all the operations. In other implementations, user-generated content friendship module 140 executing at collaboration platform 120, client device 110A, client device 110B, server 130 or combination thereof may perform some or all the operations. Elements of FIGS. 1 and 4-7 may be used to help illustrate method 200. It may be noted that the in some implementations, method 200 may include the same, different, fewer, or a greater number of operations performed in any order.

At block 205 of method 200, processing logic performing method 200 provides, to a client device 110A of the creating user, a developer interface of the collaboration platform 120. The developer interface allows the creating user to create a game specification for a game 122 and to specify the condition (also referred to "social interaction condition" herein) that identifies the first social interaction criteria for the playing users playing the game. The satisfaction of the first social interaction criteria of the condition qualifies at least one of the playing users to receive a friend request. An example of a developer interface (e.g., user interface 400 of FIG. 4 and user interface 500 of FIG. 5) is further illustrated with respect to FIGS. 4 and 5.

Figure 4:
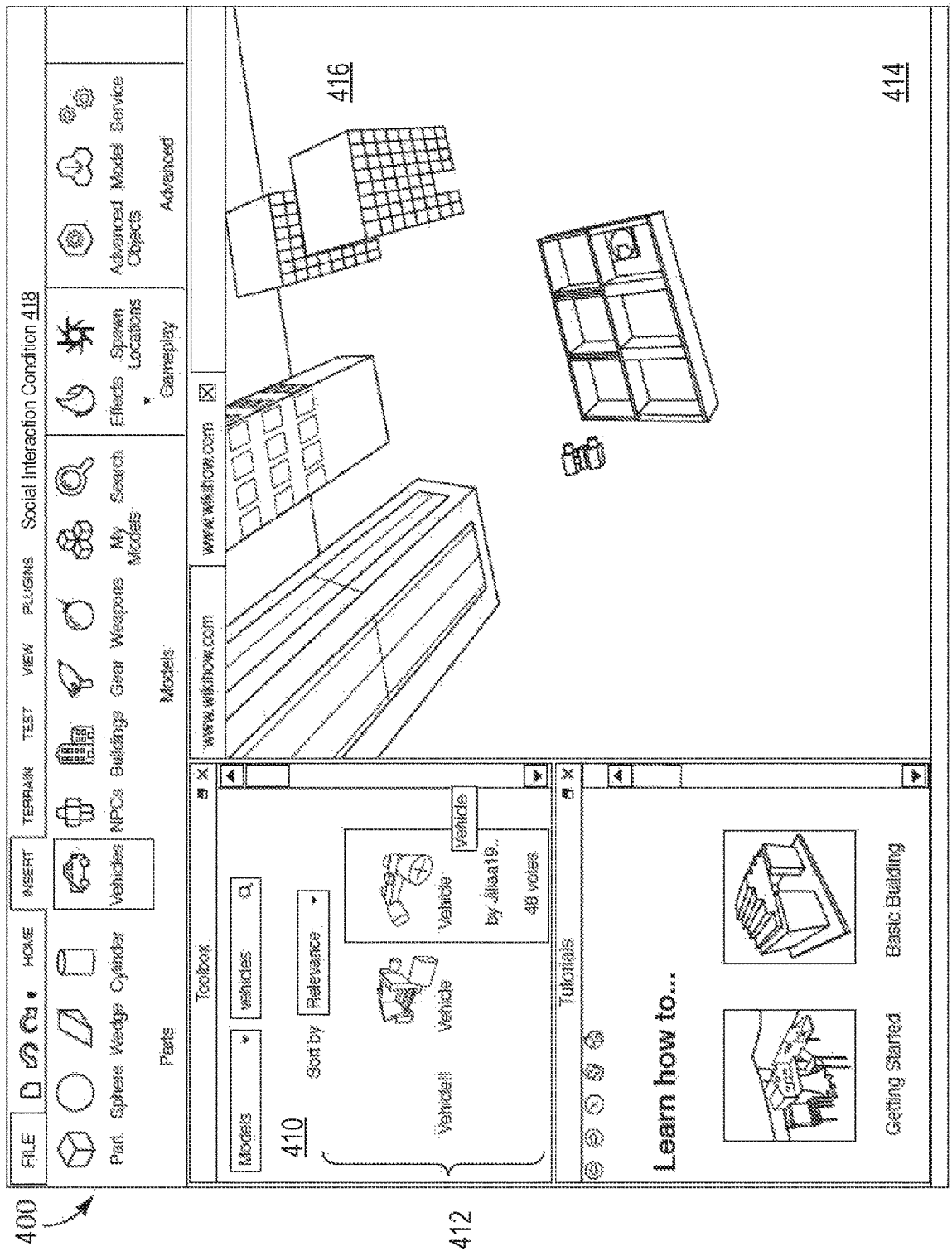
FIG. 4 illustrates a user interface to create and build games on the collaboration platform, in accordance with some implementations of the disclosure.

Referring to FIG. 4, a creating user may use user interface 400 to design a game specification for a game that may be hosted by collaboration platform 120 and publish the game so that the game is available or accessible to playing users of collaboration platform 120 to play.

Returning to FIG. 2, in implementations a social interaction condition may include one or more user-generated conditions specified by a creating user and may identify social interaction criteria for at least two users (e.g., playing users) who are playing the game.

Figure 5:
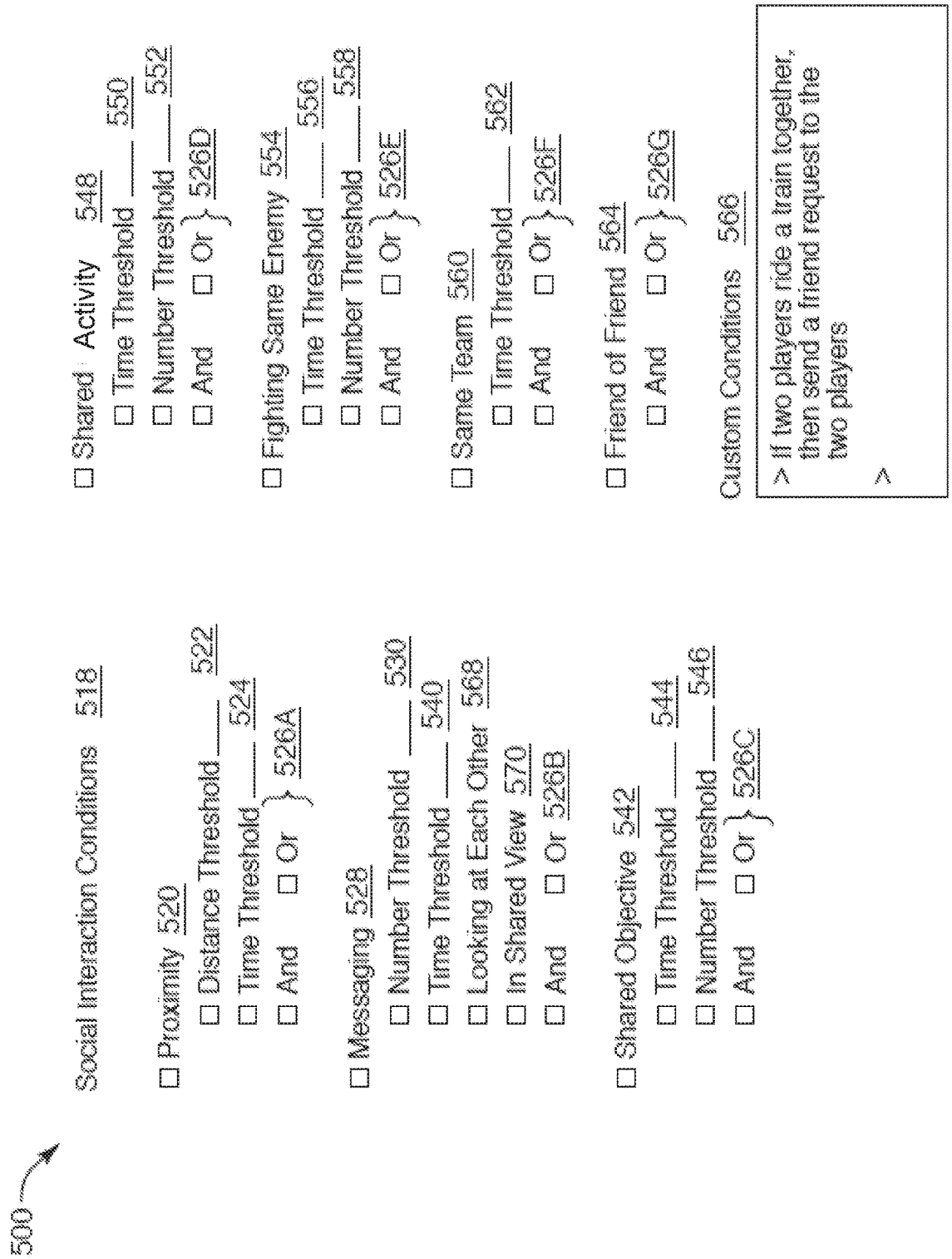
FIG. 5 illustrates a user interface that allows a creating user to select a social interaction condition to establish friendships via a creating user's game, in accordance with some implementations of the disclosure.

Referring to FIG. 5, in some implementations the developer interface (e.g., user interface 500 of FIG. 5) allows a user to specify the social interaction condition 518 from a predetermined selection of criteria or allows the user to create a social interaction condition 518 that is specific to the creating user's game. For example, a creating user may select criteria (e.g., proximity 520) from a predetermined selection of criteria that identifies social interaction criteria for two users (proximity of the characters in the game), the satisfaction of which causes the collaboration platform 120 to send a friend request to at least one of the two users. In another example, the creating user may create a customized social interaction condition that is specific to the creating user's game. For example, if the game is a hide and seek game, the custom social interaction criteria may be the amount of time two characters hide together at the same location. Game data may indicate that the two characters are in a same virtual location in the game environment for at least a threshold period of time. The game data also indicates that the two characters are engaged in a hiding activity (e.g., not visible form certain camera angles that correspond to other playing users' perspective). It can be noted that social interaction between two playing users can be represented by game data, as further described below with respect to FIG. 2A and FIG. 5.

Returning to FIG. 2, at block 210 processing logic receives the game specification for game 122 created by the creating user using the developer interface (e.g., user interface 400 of FIG. 4) of the collaboration platform 120 and the condition (e.g., social interaction condition) specified by the creating user. It can be noted that the game specification may include the condition or the condition may be separate from the game specification. For example, creating user may save a game specification for game 122 using the developer interface and publish the game 122 so that game 122 is hosted by collaboration platform 120 (or at least accessible by the playing users of the collaboration platform 120) and available to playing users of collaboration platform 120 to play.

At block 215, processing logic hosts the game 122 on a collaboration platform 120 to allow playing users to participate in gameplay of the game 122. In hosting a game 122, collaboration platform 120 may allow users via client devices 110 to use or access the hardware and software resources of collaboration platform 120 to play game 122.

At block 220, processing logic may identify a condition (e.g., social interaction condition) of the game 122. In implementations, the social interaction condition has been specified by the creating user of the game 122. In implementations, the condition identifies first social interaction criteria for the plurality of playing users. The satisfaction of the condition (e.g., satisfaction of the first social interaction criteria) qualifies at least one of the first playing user or the second playing user to receive a friend request.

For example, subsequent to receiving the game specification for the game 122 and the associated social interaction condition specified by the creating user, the collaboration platform 120 may store both the game specification of the game 122 and the social interaction condition (e.g. social interaction condition 518 of FIG. 5) in memory. As playing users participate in gameplay of the game 122, collaboration platform 120 (or game) may retrieve the social interaction condition associated with the particular game 122 from memory.

In an illustrative example, the social interaction condition identified by the collaboration platform 120 includes at least one of the proximity (e.g., same environment) of two playing user's characters in the game environment of the game during gameplay for a threshold amount of time (e.g., 5 minutes) or a threshold number of messages sent between two playing users (e.g., 20 messages sent between the two users during a playing session of game 122). The game data used to evaluate the aforementioned condition is further described below with respect to FIG. 2A and FIG. 5.

At block 225, responsive to identifying the condition (e.g., social interaction condition) of the game 122 specified by the creating user, processing logic monitors for events indicative of the first social interaction between the playing users of the game 122. It can be noted that game data (e.g., data structures) may indicate or identify social interaction between two or more playing users.

In an implementation, monitoring for events indicative of the first social interaction between the playing users of the game include monitoring a game environment associated with the game for in-game events indicative of social interaction between the first playing user and the second playing user within the game environment.

In an implementation, monitoring for events indicative of the first social interaction between the playing users of the game include monitoring for global events indicative of social interaction between the first playing user and the second playing user outside a game environment of the game.

In some implementations, the game data may identify or be indicative of events, such as in-game events or global events, of social interaction between playing users. In implementations, the monitoring for events may be for events performed within the game environment (e.g., riding the same rollercoaster) with game-specific physics. In-game events may be events performed within the game environment. In some implementations, the collaboration platform 120 may have access (e.g., using and API or directly and without an API) to game data indicative of the in-game events. In other implementations, the game may have access to game data indicative to the in-game events and send the game data (e.g., using an API) or decisions made using the game data to the collaboration platform 120.

In implementations, the monitoring may be for events that are global events (also referred to as "platform events" herein). Global events are performed outside the game environment but on the collaboration platform 120. For example, the users A and B are playing together for the last 2 hours on a different game. Users A and B have engaged in a chat conversation N times in the past week while playing games X, Y, and Z. In some implementations, the collaboration platform 120 may have access (e.g., without an API) to game data indicative of the global events. In other implementations, the game may have access to game data indicative to the global events by using an API to retrieve game data indicative of global events from the collaboration platform 120.

In implementations, collaboration platform 120 may perform some or all the operations described herein using the game data generated by the collaboration platform 120 (e.g. global events), received from the game (e.g., in-game events), or a combination thereof. In still other implementations, the game may perform some or all the operations described herein using the game data received from the collaboration platform 120 (e.g. global events), generated by the game (e.g., in-game events), or a combination thereof. In still other implementation, the game may be integrated with the collaboration platform 120 in a manner that the collaboration platform 120 has access to all (or most) the game data (via an API or without an API) and performs all (or some) of the operations described herein.

At block 230, processing logic determines that a social interaction (determined using game data) between the first playing user and the second playing user satisfies first social interaction criteria of the condition (e.g., social interaction condition) of the game 122. For example, the condition submitted by the creating user may be compared to game data indicative of the social interactions between playing users of the game to determine whether the condition is satisfied.

For instance, the condition selected by the creating user is that two playing users are to be proximate (e.g., in the same environment of a game) for at least 5 minutes. The collaboration platform 120 (or game) can use game data to determine that two playing users have been proximate (e.g., within a threshold distance) for 8 minutes, which satisfies the condition. In another instance, the condition selected by the creating user is that two playing users message one other 20 times during a gameplay session. The collaboration platform 120 (or game) using the game data may determine that two playing users have sent 10 messages during a gameplay session, which does not satisfy the condition.

At block 235, responsive to determining that the first social interaction between the two playing users satisfies the first social interaction criteria of the condition (e.g., social interaction condition) of the game 122, processing logic sends the friend request to a first client device of the first playing user inviting the first playing user to establish a friendship on the collaboration platform 120 (or game) with the second playing user. In some implementations, processing logic sends the friend request to a first client device of the first playing user and a second client device of the second playing user inviting the first playing user and the second playing user to establish a friendship on the collaboration platform 120 (or game). In some implementations, responsive to determining that the social interaction between the two playing users does not satisfy the condition (e.g., social interaction condition) of the game 122, processing logic does not send a friend request to either of the two users and continues to monitor for events.

In some implementations, processing logic may check to determine whether the two playing users are already friends via the collaboration platform 120. If processing logic determines that two playing users are already friends, processing logic does not send a friend request irrespective of whether or not the social interaction of the two playing users satisfied the condition. If processing logic determines that the two playing users are not friends and the social interaction between the two playing users satisfies the condition, processing logic may send a friend request to at least one of the two playing users.

In some implementations, one or more of the playing users that satisfy the condition may be presented with a friend suggestion that includes the other playing user(s) that satisfied the condition. For example, the first playing user may receive a friend suggestion suggesting that the second playing user become a friend. The first playing user may select the second playing user from the friend suggestion, which initiates a friend request to be sent to the second playing user requesting to establish a friendship with the first playing user.

In some implementations, a friendship may be established via the collaboration platform 120 (or game) between the first playing user based on the friend request (e.g., the first playing user accepts the friend request).

At block 240, subsequent to establishing the friendship between the first playing user and the second playing user, processing logic determines whether the friendship between the first playing user and the second playing user satisfies a quality friendship threshold. In implementations, a "quality friendship" may refer to a friendship between two playing users that satisfies (equals or exceeds) the quality friendship threshold, which gives an indication that the friendship between the two playing users endures after playing the game or an indication that the two playing users continue to socially interact with one another on the collaboration platform 120 after the friendship is established.

In some implementations, collaboration platform 120 may implement quality friendship determination operations determine whether the friendships created using the user-generated condition(s) establish quality friendships (e.g., exceeds a quality friendship threshold).

Responsive to determining the friendship is a quality friendship, processing logic proceeds to block 245, where the collaboration platform 120 provides recognition (e.g., recognition action) to the creating user or game. Responsive to determining the friendship is not a quality friendship, processing logic proceeds to block 250, where processing logic performs a punitive action with respect to the creating user or game. Determining whether the friendship between the first playing user and the second playing user satisfies a quality friendship threshold is further described with respect to FIG. 3. In implementations, recognition and punitive actions may be used to incentivize creating users to establish quality friendships, rather than spam playing users with friend requests, for example.

At block 245, responsive to determining that the friendship between the first playing user and the second playing user is a quality friendship, processing logic provides recognition to the creating user or the game. In some implementations, recognition may include increasing the visibility of the game on the collaboration platform 120 or increasing the visibility of the game in search results responsive a search query on the collaboration platform 120.

In some implementations, games that are identified as creating quality friendships may be ranked higher than games that are not identified as creating quality friendships. For example, collaboration platform 120 may determine the number of quality friendships created by each game over a time period. The games may be ranked corresponding to the number of quality friendships (e.g., the game having established the most quality friendships may be ranked first, and the game having established the second most quality friendships may be ranked second, and so forth). The higher ranking games may be promoted over lower ranking games. For instance, the search results for games may more likely include games that are ranked high with respect to creating quality friendships over similar games that are not ranked high with respect to creating quality friendships. In another example the number of quality friendships created by each game may be a ratio between the number of quality friendships and the number of friend requests submitted. In still another example, the number of quality friendships may be a ratio between the number of quality friendship and the total number of friendships established.

In some implementations, recognition may include inserting a game identifier of the game into search results responsive to a search query on the collaboration platform. In some implementations, recognition can include being monetarily compensated or compensated with virtual currency of the collaboration platform 120, for example. Search results with respect to quality friendships are further described with respect to FIG. 6.

At block 250, responsive to determining that the friendship between the first playing user and the second playing user is not a quality friendship, processing logic performs a punitive action with respect to the creating user. In some implementations, a punitive action may include removing the game from search results, reducing a ranking of a game in a ranked list of games such as a list for "top games to make friends" or the like.

In some implementations, games that are identified as not creating quality friendships may be ranked lower than games that are identified as creating quality friendships For example, collaboration platform 120 may determine the number of quality friendships created by each game over a time period. The games may be ranked corresponding to the number of quality friendships (e.g., the game having established the most quality friendships may be ranked first, and the game having established the second most quality friendships may be ranked second, and so forth). The lower ranking games may not be promoted or be less promoted than higher ranking games. For instance, the search results for games may more likely include games that are ranked high with respect to creating quality friendships over similar games that are not ranked high with respect to creating quality friendships. In some implementations, lower ranking games with respect to quality friendships may not show up in search results, may less frequently show up in search results, or be less visible in search results (e.g., below the page fold).

At block 255, processing logic determines a metric of friendships indicative of the response to the friend requests sent in response to satisfying a condition selected by the creating user. The friendship may include the friendship between the first playing user and the second playing user, as well as other friendships created via friend requests prompted by the creating user's social interaction condition. A metric of friendships may refer to one or more values, statistics, or identifiers that inform the creating user about friend requests sent and friendships created using the social interaction condition selected by the creating user.

Figure 7:
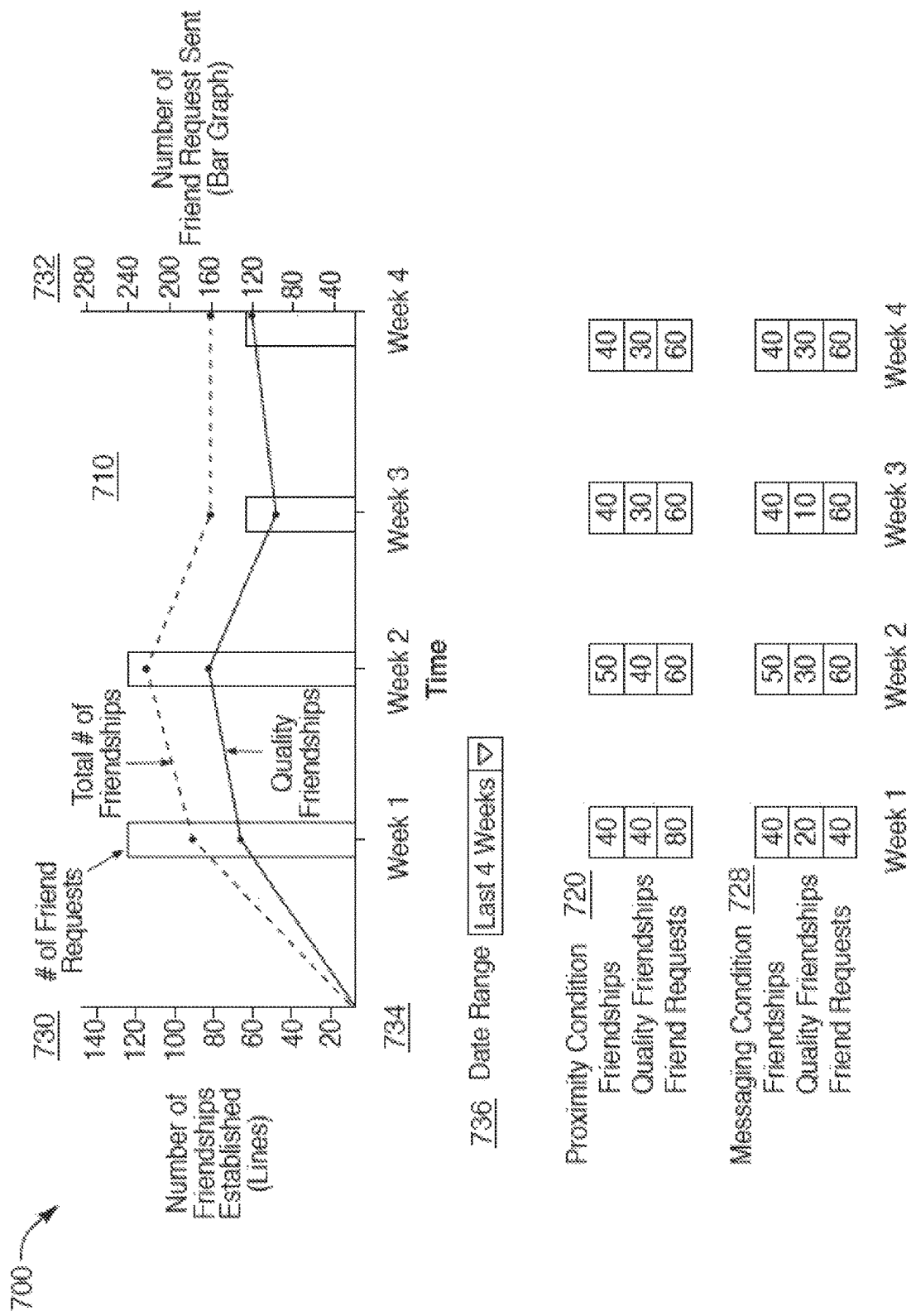
FIG. 7 illustrates a user interface to present a metric of friendships, in accordance with some implementations of the disclosure.

At block 260, processing logic provides the metric of friendships for presentation on the client device of the creating user. A user interface 700 of FIG. 7 is provided below to help illustrate an example of the presentation of the metric of friendships.

Figure 2B:
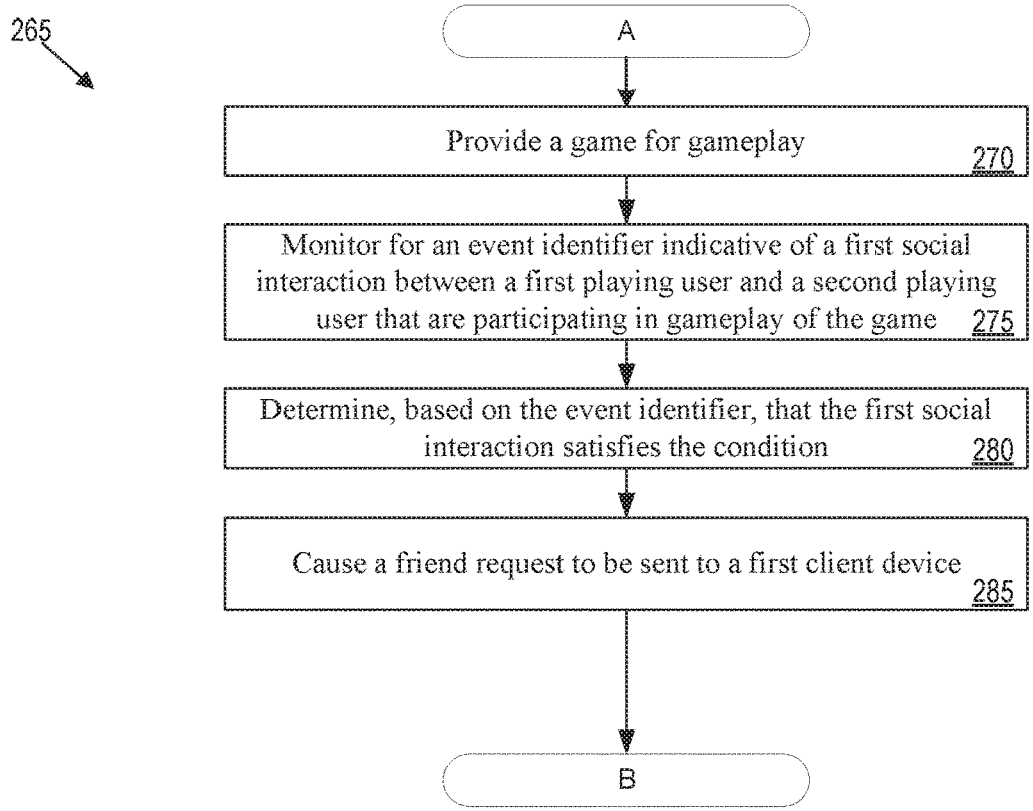
FIG. 2B is a flow diagram illustrating method for establishing friendships using a game, in accordance with implementations of the disclosure.

FIG. 2B is a flow diagram illustrating method for establishing friendships using a game, in accordance with implementations of the disclosure. Method 265 may be performed by processing logic that includes hardware (e.g., circuitry, dedicated logic, programmable logic, microcode), software (e.g., instructions run on a processing device to perform hardware simulation), or a combination thereof. In some implementations, user-generated content friendship module 140 executing on a game server hosting a game 122 may perform some or all the operations. In other implementations, user-generated content friendship module 140 executing at collaboration platform 120, client device 110A, client device 110B, server 130 or combination thereof may perform some or all the operations. Elements of FIGS. 1, 2A and 4-7 may be used to help illustrate method 265. It may be noted that the in some implementations, method 265 may include the same, different, fewer, or a greater number of operations performed in any order. In may be further noted that in some implementations, method 265 may include one or more operations as described with respect to FIG. 2A.

At block 270, processing logic implementing method 265 may provide a game 122 for gameplay. The game 122 is accessible by playing users via a collaboration platform 120. The game 122 is associated with a condition that identifies first social interaction criteria for the playing users playing the game. Satisfaction of the condition qualifies at least one of the playing users to receive a friend request. In an implementation, the game 122 may be hosted by a game server outside of collaboration platform 120. Collaboration platform 120 may provide access to the game via a search engine, resource locator (e.g., link), or otherwise so that users of the collaboration platform 120 may access and play the game 122. In still other implementations, the collaboration platform 120 may host the game 122. In implementations, the game may exchange data or share resources with the collaboration platform 120 using an API.

At block 275, processing logic may monitor for an event identifier indicative of a first social interaction between a first playing user and a second playing user of the playing users that are participating in the gameplay of the game In some implementations, monitoring for the event identifier indicative of the first social interaction between the first playing user and the second playing user of playing users that are participating in the gameplay of the game includes monitoring a game environment associated with the game for an identifier of an in-game event (e.g., game data) indicative of social interaction between the first playing user and the second playing user within the game environment. In implementations, the game 122 may monitor for the game data generated by the game 122 to identify in-game events in the game environment. In one example, an in-game event includes the proximity of the first character associated with the first playing user and a second character associated with the second playing user within the game environment of the game.

In some implementations, monitoring for the event identifier indicative of the first social interaction between the first playing user and the second playing user of playing users that are participating in the gameplay of the game includes receiving, from the collaboration platform 120, an identifier of a global event indicative of social interaction between the first playing user and the second playing user outside the game environment of the game and on the collaboration platform. For example, the game may use an API to request and receive game data from the collaboration platform 120 indicative global events. In an example, a global event includes messaging between the first playing user and the second playing user concurrent with the first playing user and second playing user participating in the gameplay of the game.

At block 280, processing logic determines, based on the event identifier that the first social interaction between the first playing user and the second playing user satisfies the first social interaction criteria identified by the condition.

At block 285, processing logic causes the friend request to be sent to a first client device of the first playing user inviting the first playing user to establish a friendship with the second playing user on the collaboration platform (or game). In an implementation, the game 122 may send an indication to collaboration platform 120 requesting the collaboration platform 120 to send a friend request to that the first client device of the first playing user. In another implementation, the game 122 (or game server) may send the friend request to that the first client device inviting the first playing user to establish a friendship with the second playing user on the collaboration platform or on the game 122.

Figure 3:
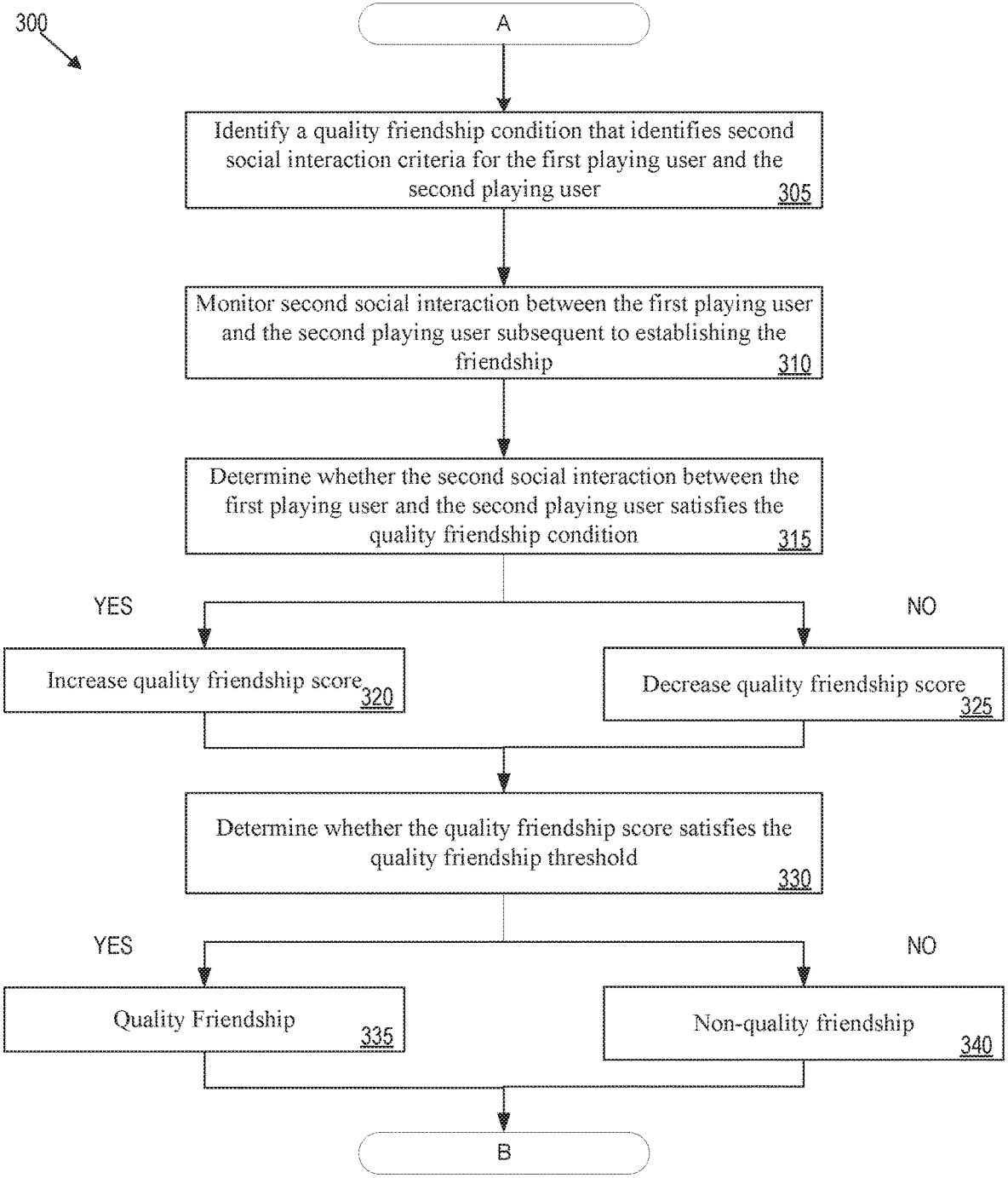
FIG. 3 is a flow diagram illustrating a method for determining whether the friendship satisfies the quality friendship threshold, in accordance with implementations of the disclosure.

FIG. 3 is a flow diagram illustrating method 300 for determining whether the friendship satisfies the quality friendship threshold, in accordance with implementations of the disclosure. Method 300 may be performed by processing logic that includes hardware (e.g., circuitry, dedicated logic, programmable logic, microcode), software (e.g., instructions run on a processing device to perform hardware simulation), or a combination thereof. In some implementations, user-generated content friendship module 140 executing at collaboration platform 120 may perform some or all the operations. In other implementations, user-generated content friendship module 140 executing at collaboration platform 120, client device 110A, client device 110B, server 130 or combination thereof may perform some or all the operations. Elements of FIGS. 1, 2A and 4-7 may be used to help illustrated method 300. It may be noted that the in some implementations, method 300 may include the same, different, fewer, or a greater number of operations performed in any order.

At block, 305 processing logic identifies a quality friendship condition that identifies second social interaction criteria for the first playing user of the second playing user. It can be noted that the second social interaction criteria may be the same or different than social interaction criteria described with respect to FIGS. 2A and 5. In some implementations, the quality friendship criteria may be determined by the collaboration platform 120. For example, an administrator of the collaboration platform 120 may determine and specify quality friendship criteria for a particular pair of playing users, a particular game, or for the collaboration platform 120 generally. A quality friendship condition may refer to a measure of social interaction between two friends after a friendship is established. For example, criteria of a quality friendship condition may include the frequency (or amount of time) over a time period that two friends play the same games. In another example, the criteria of a quality friendship condition may be the number of times over a time period the two friends message one another. In some implementations, the criteria of a quality friendship condition may include one or more of the social interaction criteria as described herein (e.g., social interaction condition 518 of FIG. 5). In some implementations, the criteria of a quality friendship condition may include the number of social interactions over a time period compared to a threshold. It can be noted that one or more quality friendship conditions may be established.

At block 310, processing logic monitors the second social interaction between the first playing user and the second playing user (e.g., for a time period) subsequent to establishing the friendship between the first playing user and the second playing user on the collaboration platform 120. The monitoring of the social interaction between two friends may be similar to block 225 of FIG. 2A but for the social interactions between friends is monitored for multiple games and across the platform.

In an implementation, monitoring the second social interaction between the first playing user and the second playing user subsequent to establishing the friendship between the first playing user and the second playing user on the collaboration platform 120 includes monitoring for global events indicative of the second social interaction between the first playing user and the second playing user. The global events may include social interaction between the first playing user and the second playing user within another game environment associated with another game of the collaboration platform.

In an implementation, the global events may include a number of times the first playing user and the second playing user engaged in a messaging conversation subsequent to establishing the friendship (e.g., in the platform in the same game 122 or different games, etc.).

At block 315, processing logic determines whether the social interaction between the first playing user and the second playing user satisfies the quality friendship condition.

At block 320, responsive to determining that the second social interaction between the first playing user and the second playing user satisfies the quality friendship condition, processing logic increases a quality friendship score associated with the first playing user and the second playing user. At block 325, responsive to determining that the second social interaction between the first playing user and the second playing user does not satisfy the quality friendship condition, processing logic decreases (or does not increase) the quality friendship score.

In some implementations, quality friendship condition used to increase the quality friendship score may be different that the quality friendship condition used to decrease the quality friendship score. For example, the quality friendship condition used to increase the quality friendship score may be game data indicating that the first playing user and second playing user message 20 times in a week after establishing the friendship. The quality friendship condition used to decrease the quality friendship score may be game data indicating the first playing user and second playing user have not messaged in a week after establishing the friendship. Message between the playing users 1-19 times the week after establishing the friendship does not change the quality friendship score.

At block 330, processing logic determines whether the quality friendship score satisfies the quality friendship threshold. The friendship satisfies the quality friendship threshold responsive to the quality friendship score equaling or exceeding the quality friendship threshold. The friendship does not satisfy quality friendship responsive to the quality friendship score being less than the quality friendship threshold. In some implementations, multiple conditions may be evaluated. In some implementations, the condition(s) may be evaluated over a predetermined time period (e.g., day, week, month, etc.).

FIG. 4 illustrates a user interface to create and build games on the collaboration platform, in accordance with some implementations of the disclosure. Elements of FIG. 1 may be used to help illustrate FIG. 4. In implementations, user interface 400 may be a developer interface that allows a creating user to access creator module 126 of collaboration platform 120. In implementations, a creating user may use collaboration application 114 of client device 110 (e.g., client device 110A) to access user interface 400.

User interface 400 shows a search engine portal 410 that allows a creating user to search for content items, such as game objects (e.g., parts and models). In the present example, the creating user submits a search query to the search engine (not shown) of collaboration platform 120 using the search term, "vehicles." Search engine may perform a search process that returns relevant search results 412 of content items, such as game objects based on a search term, such as "vehicles."

User interface 400 illustrates the placement or insertion of game objects in a game workspace 414. For example, game object 416 (e.g., building) has been retrieved from the search engine portal 410 and inserted into a game workspace 414 to create a game environment of game 122. In some implementations, the user may save the game 122 created using user interface 400 and publish the game to collaboration platform 120. In some implementations, the game 122 may be created local to client device 110 using user interface 400 and uploaded to collaboration platform 120. In other implementations, the game 122 may be created using user interface 400 where the game 122 is created on and stored at collaboration platform 120. Responsive to publishing the game 122 using user interface 400, collaboration platform 120 may host the game and allow users to access and play the game 122.

In some implementations, user interface 400 may include various resources to help a creating user create a game. For example, the upper tool bar includes different tabs, such as "home," "insert," "terrain," "test," etc. As illustrated, user interface includes the tab, social interaction condition 418 tab. In implementations, a user may use the social interaction condition 418 tab to access a user interface window that allows the creating user to select or create user-generated conditions that identify social interactions between users of the game 122 that qualify the users to receive a friend request. The user interface 500 window asserted by the social interaction condition 418 tab is further described with respect to FIG. 5.

FIG. 5 illustrates a user interface that allows a creating user to specify social interaction criteria for a social interaction condition, in accordance with some implementations of the disclosure. Elements of FIG. 1 may be used to help illustrate FIG. 5. In implementations, user interface 500 may be part of a developer interface that allows a creating user to access creator module 126 of collaboration platform 120. In other implementations, user interface 500 may be separate from the developer interface. In implementations, a creating user may use collaboration application 114 of client device 110 (e.g., client device 110A) to access user interface 500.

User interface 500 shows social interaction condition 518, which may include one or more criteria available for the user to select. As noted above, the user may select the social interaction condition 518 for a particular game that the creating user designs. Playing users playing the game and whose social interactions satisfy the selected social interaction condition 518 receive a friend request to establish a friendship on collaboration platform 120. It may be noted that the criteria included in social interaction condition 518 are provided for illustration, rather than limitation. In other implementations, social interaction condition 518 may include the same, different, fewer, or greater options or criteria.

In some implementations, a social interaction condition 518 may include a proximity 520 criteria where the proximity of two characters in a game environment during gameplay causes collaboration platform 120 to send a friend request to the two users association with the two characters. The proximity 520 criteria may be further refined so the proximity 520 criteria is satisfied responsive to satisfying a distance threshold 522, a time threshold 524, or combination thereof. For example, game data with respect to the proximity 520 criteria may identify the users (e.g., collaboration platform user ID), the characters' locations within the game environment, and timestamps with respect to the locations and may be provided by the game or collaboration platform 120. The game data with respect to proximity criteria 520 may be indicative of an in-game event and be used to calculate relative proximity (e.g., distance within a threshold) of two characters and the amount of time characters spend in relative proximity. The relative proximity and the time spent in relative proximity may be compared to the distance threshold 522 and a time threshold 524 respectively to determine if the proximity 520 criteria are satisfied.

It can be noted that game data as described herein may be generated by the collaboration platform 120 or the game. In some implementations, game data indicative of in-game events in the game environment may be generated by the game and game data indicative of global events outside the game environment may be generated by collaboration platform 120. In some implementations, the game data may be provided to the game by the collaboration platform via an API, and vice versa. For example, the game may send an API request and receive API responses from the collaboration platform 120 that include the game data.

In some implementations, the proximity 520 criteria may be used in conjunction with other criteria of social interaction using logical operators 526, such as logical AND or logical OR. For instance, using the logical AND operator, the creating user may select that the proximity 520 criteria and another criteria such as the messaging 528 criteria so that both criteria must be satisfied before a friend request is sent. In another instance using the logical OR operator, the creating user may select that any one of the proximity 520 criteria or another criteria such as the messaging 528 criteria are to be satisfied before a friend request is sent. It may be noted that all the criteria of the social interaction condition 518 may use logical operators 526.

In some implementations, a social interaction condition 518 may include a messaging 528 criteria where messaging between two users participating in gameplay causes collaboration platform 120 to send a friend request to the two users. The messaging 528 criteria may be further refined so the messaging 528 criteria is satisfied responsive to satisfying a number threshold 530, a time threshold 540, a sub-condition where the two users are concurrently messaging and looking at each other 568, a sub-criteria where the two users are concurrently messaging and may view one another 570 on their respective client device, or a combination thereof. In some implementations, the users may message in the particular game for which the social interaction condition 518 has been specified, leave the game and continue to message outside the particular game and continue to message within the collaboration platform 120 (e.g. in one or more other games). In another implementation, the users may be messaging before entering the particular game for which the social interaction condition 518 has been specified.

In implementations, game data (also referred to as "platform data" herein) with respect to the messaging 528 criteria may be obtained from the collaboration platform 120 (e.g., using an API). The game data identifies the users participating in gameplay of the game, whether the users are messaging one another, the number of times the users are messaging while participating in gameplay of the game, historic data regarding messaging between the users (e.g., in other games and number of times the users messaged one another), and information about the users messaging after one or more of the users leave the game (e.g., whether the users continue to message one another, start another conversation, the number of times the users message one another outside the respective game, etc.). In implementations, the game data with respect to messaging may identify a global event indicative of social interaction between player users outside the game environment of the game.

In some implementations, a social interaction condition 518 may include a shared objective 542 criteria where two users participating in gameplay and have a shared objective (e.g., rescue another character, find a special object, defeat an enemy, etc.) causes collaboration platform 120 or the game to send a friend request to the at least one of the playing users. The shared objective 542 criteria may be further refined so the shared objective 542 criteria is satisfied responsive to satisfying a number threshold 546, a time threshold 544, or a combination thereof. In one implementation, the game may determine that at least two users are participating in a shared objective and send an indication to collaboration platform 120 that the two players have satisfied the shared objective 542 criteria.

An example of a shared objective 542 includes wining an enemy post by collaboration, which may be represented in game data (e.g., the data structures of the game) that indicates that two or more users that form a team, that the game provides gameplay that includes an objective to capture an enemy post, and that upon detecting that the enemy post was captured, that the first social interaction has taken place between each pair of playing users in the two or more playing users.

In implementations, game data with respect to shared objective 542 criteria may identify the users (e.g., collaboration platform user ID, which may be received from the collaboration platform 120 via an API), a data structure that indicates that the users are participating in a shared objective, and timestamps identifying a time range during which the users participated in the shared objective. The game data with respect to the shared objective 542 criteria may be indicative of an in-game event and be used to determine whether the shared objective 542 criteria has been satisfied.

In some implementations, a social interaction condition 518 may include a shared activity 548 criteria where two users participating in gameplay and participating in a same or similar activity (e.g., riding the same vehicle, mining the same area, etc.) causes collaboration platform 120 (or game) to send a friend request to at least one of the two users. The shared activity 548 criteria may be further refined so the shared activity 548 criteria is satisfied responsive to satisfying a number threshold 552 (e.g., number of shared activities), a time threshold 550, or a combination thereof.

In implementations, game data with respect to the shared activity 548 criteria may identify the users (e.g., collaboration platform user ID, which may be received from the collaboration platform 120 via an API), a data structure that indicates that the users are participating in a shared activity, and timestamps identifying a time range during which the users participated in the shared activity. The game data with respect to the shared activity 548 criteria may be indicative of an in-game event and be used to determine whether the shared activity 548 criteria has been satisfied.

In some implementations, a social interaction condition 518 may include a fighting the same enemy 554 criteria (e.g., also may be considered a sub-criteria of the shared objective 542 criteria) where two users participating in gameplay and fighting the same game object (e.g., another character or game-generated game object) causes collaboration platform 120 or the game to send a friend request to at least one of the two users. The fighting the same enemy 554 criteria may be further refined so the fighting the same enemy 554 criteria is satisfied responsive to satisfying a number threshold 558 (e.g., number of enemies), a time threshold 556, or a combination thereof.

In implementations, game data with respect to the fighting the same enemy 554 criteria may identify the users (e.g., collaboration platform user ID, which may be received from the collaboration platform 120 via an API), a data structure that indicates that the users are participating in fighting the same enemy, the number enemies, and timestamps identifying a time range during which the users participated in fighting the same enemy. The game data with respect to the fighting the same enemy 554 criteria may be indicative of an in-game event and be used to determine whether the fighting the same enemy 554 criteria has been satisfied.

In some implementations, a social interaction condition 518 may include a the same team 560 criteria where two users participating in gameplay and their respective characters are on the same team causes collaboration platform 120 or game to send a friend request to at least one of the two users. The same team 560 criteria may be further refined so the same team 560 criteria is satisfied responsive to satisfying a time threshold 562.

In implementations, game data with respect to the same team 560 criteria may identify the users (e.g., collaboration platform user ID, which may be received from the collaboration platform 120 via an API), a data structure that indicates that the users are participating on a same team, and timestamps identifying a time range during which the users are on the same team. The game data with respect to the same team 560 criteria may be indicative of an in-game event and be used to determine whether the same team 560 criteria has been satisfied.

In some implementations, a social interaction condition 518 may include a friend of a friend 564 criteria where two users participating in gameplay and that have a mutual friend (e.g., via the collaboration platform 120) in common (e.g., the number of mutual friends exceeds a threshold number) causes collaboration platform 120 or game to send a friend request to at least one of the two users.

In implementations, game data with respect to the friend of a friend 564 criteria may be obtained from the collaboration platform 120 (e.g., using an API). The game data identifies the users participating in gameplay of the game, and whether the users share one or more mutual friends, and the number of mutual friends between the users. In implementations, the game data with respect to the friend of a friend 564 criteria may identify a global event indicative of social interaction between player users outside the game environment of the game.

In some implementations, a social interaction condition 518 may include custom 566 criteria where the creating user may create customized social interaction criteria that are specific to the creating user's game. For example, if the game is a hide and seek game, the custom social interaction condition may be the amount of time two players hide together at the same location. In another example, if the game is train game, the custom social interaction condition may be the amount of time two players ride a train together. In some implementations, the custom 566 criteria may be implemented using natural language, pseudo code, or a particular coding language.

In implementations, game data with respect to the custom 566 criteria may identify the users (e.g., collaboration platform user ID, which may be received from the collaboration platform 120 via an API), a data structure that indicates that the users are participating in a an activity etc. identified by the custom 566 criteria, and timestamps identifying a time range during which the users participated in the activity, etc. The game data with respect to the custom 566 criteria may be indicative of an in-game event and be used to determine whether custom 566 criteria has been satisfied. It can be noted that the game data with respect to the custom 566 criteria may identify different in-game events and is dependent on the custom 566 criteria specified by the creating user.

Figure 6:
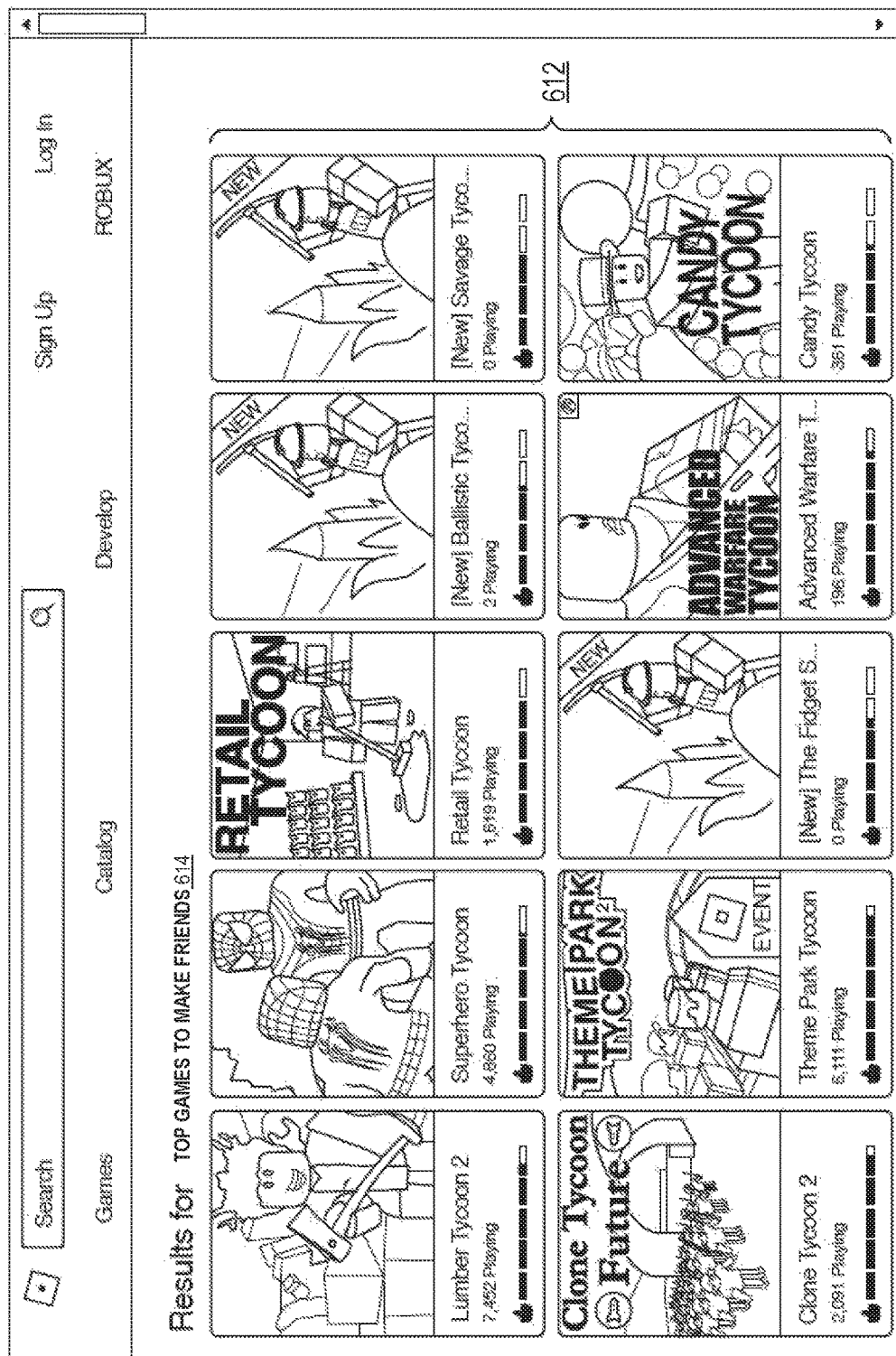
FIG. 6 illustrates a user interface showing search results for games, in accordance with some implementations of the disclosure.

FIG. 6 illustrates a user interface showing search results for games, in accordance with some implementations of the disclosure. Elements of FIG. 1 may be used to help illustrate FIG. 6. User interface 600 shows the search results 612 for a search query using the search term 614, "Top Games to Make Friends." As illustrated, the search results 612 include identifiers (e.g., images) of the respective games. In implementations, a user may select a game (e.g., game identifier) from the search results 612 to access the game from collaboration platform 120 or access the game hosted outside the collaboration platform 120. In some implementations, the games (e.g., game identifiers) may be displayed in a ranked order. For example, the games may be displayed top, left to right, bottom, left to right in descending ranking order (e.g., 1 through 10 ranking).

In some implementations, games that are identified as creating quality friendships may be ranked higher than games that are not identified as creating quality friendships. For example, collaboration platform 120 may determine the number of quality friendships created by each game over a time period. The games may be ranked corresponding to the number of quality friendships (e.g., the game having established the most quality friendships may be ranked first, and the game having established the second most quality friendships may be ranked second, and so forth). The higher ranking games may be promoted over lower ranking games. For instance, the search results for "top games to make friends" may include the highest ranking games.

In some implementations, games that are identified as not creating quality friendships may be ranked lower than games that are identified as creating quality friendships. A punitive action may include ranking a game lower than other games with higher friendship quality. The lower ranking games may not be promoted or be less promoted than higher ranking games. For instance, lower ranking games with respect to quality friendships may not show up in search results 612, may less frequently show up in search results 612, or be less visible in search results 612 (e.g., below the page fold).

FIG. 7 illustrates a user interface to present a metric of friendships, in accordance with some implementations of the disclosure. Elements of FIG. 1 may be used to help illustrate FIG. 7. In implementations, user interface 700 may be part of a developer interface that allows a creating user to access creator module 126 of collaboration platform 120. In other implementations, user interface may be separate from the developer interface. In implementations, a creating user may use collaboration application 114 of client device 110 to access user interface 700. It may be noted that user interface 700 is provided for illustration, rather than limitation. In other implementations, user interface may include the same, different, fewer, or additional elements.

User interface 700 illustrates a "dashboard" that is available to the creating user for displaying the metric of friendships indicative friend request sent for a particular game and the friendships established using friend requests sent in response to satisfying a social interaction condition selected by the creating user. As noted above, a metric of friendships may refer to one or more values, statistics, or identifiers that inform the creating user about friendships created using the social interaction condition selected by the creating user.

Graph 710 of user interface 700 shows a graphical representation of a metric of friendships. The right vertical axis 730 shows the number of friendships established. The horizontal axis 734 shows the time period (e.g., the last 4 weeks) for the data. The left vertical axis 732 shows the number of friend requests sent. In graph 710, the dashed line shows the total number of new friendships created for a particular time period. In graph 710, the solid line shows the total number of the new friendships that were determined to be quality friendships. In graph 710, the bar graph shows the number of friend requests sent during the particular time period.

User interface 700 also show user input 736 where the creating user may select a particular date range for which to show the metric of friendships. In some implementations, user interface 700 may show additional information. For example, user interface 700 may show the conditions of social interaction selected by the user and statics related each criteria of the condition. For instance, the user selected proximity 720 criteria and messaging 728 criteria, which may correspond to criteria (e.g., proximity 520 and messaging 528 of FIG. 5, respectively) selected by the creating user (e.g., using user interface 500 of FIG. 5).

In implementations, each of the selected proximity 720 criteria and messaging 728 criteria may show statistics that correspond to graph 710. For example, in week 1 the proximity 720 criteria selected by the created user generated 80 friend requests. 40 of the friend requests resulted in new friendships being formed on collaboration platform 120, and of those 40 new friendships all 40 were determined to be quality friendships. In another example, in week 3 the messaging condition 728 selected by the created user generated 60 friend requests. 40 of the friend requests resulted in new friendships being formed on collaboration platform 120, and of those 40 new friendships 10 friendships were determined to be quality friendships.

Figure 8:
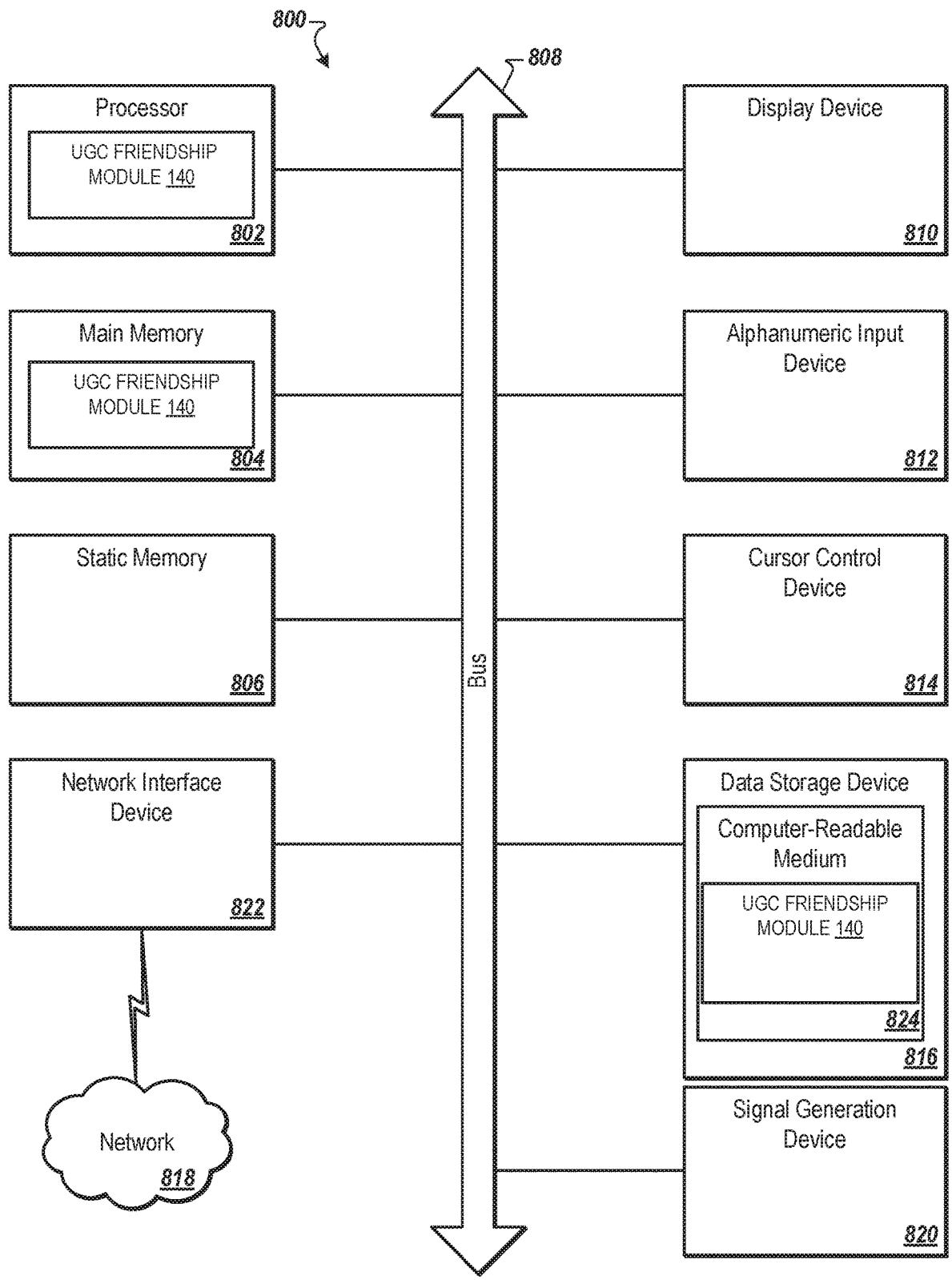
FIG. 8 is a block diagram illustrating an exemplary computer system, in accordance with implementations of the disclosure.

FIG. 8 is a block diagram illustrating an exemplary computer system 800, in accordance with implementations. The computer system 800 executes one or more sets of instructions that cause the machine to perform any one or more of the methodologies discussed herein. Set of instructions, instructions, and the like may refer to instructions that, when executed computer system 800, cause computer system 800 to perform one or more operations of user-generated content friendship module 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 816, which communicate with each other via a bus 808.

The processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions of the system architecture 100 and the user-generated content friendship module 140 for performing the operations discussed herein.

The computer system 800 may further include a network interface device 822 that provides communication with other machines over a network 818, such as a local area network (LAN), an intranet, an extranet, or the Internet. The computer system 800 also may include a display device 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a non-transitory computer-readable storage medium 824 on which is stored the sets of instructions of the system architecture 100 and user-generated content friendship module 140 embodying any one or more of the methodologies or operations described herein. The sets of instructions of the system architecture 100 and user-generated content friendship module 140 may also reside, completely or at least partially, within the main memory 804 and/or within the processing device 802 during execution thereof by the computer system 800, the main memory 804 and the processing device 802 also constituting computer-readable storage media. The sets of instructions may further be transmitted or received over the network 818 via the network interface device 822.

While the example of the computer-readable storage medium 824 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operation s leading to a desired result. The sequence of operations is those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "hosting," "determining," "receiving," "providing," "sending," "identifying," "monitoring," "increasing," "performing," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

I claim:

1. A method comprising:
   hosting, by a processing device, a game on a collaboration platform to allow a plurality of playing users to participate in gameplay of the game;
   identifying a condition of the game that is specified by a creating user of the game and identifies first social interaction criteria for the plurality of playing users, wherein satisfaction of the first social interaction criteria of the condition qualifies at least one of the plurality of playing users to receive a friend request;
   determining that a first social interaction between a first playing user and a second playing user of the plurality of playing users playing the game satisfies the first social interaction criteria of the condition of the game;
   responsive to determining that the first social interaction satisfies the first social interaction criteria of the condition, sending the friend request to a first client device of the first playing user inviting the first playing user to establish a friendship with the second playing user on the collaboration platform;
   determining a metric of friendships suggested using the condition of the game; and
   providing the metric of friendships for presentation on a third client device of the creating user.

2. The method of claim 1, wherein the game is a three-dimensional (3D) user-generated game created by the creating user using the collaboration platform.

3. The method of claim 1, further comprising:
   providing, to the third client device of the creating user, a developer interface of the collaboration platform to allow the creating user to create a game specification for the game and to specify the condition that identifies the first social interaction criteria; and
   receiving the game specification created by the creating user using the developer interface of the collaboration platform and the condition specified by the creating user.

4. The method of claim 1, further comprising:
   responsive to identifying the condition of the game specified by the creating user, monitoring for events indicative of the first social interaction between the first playing user and the second playing user.

5. The method of claim 4, wherein monitoring for events indicative of the first social interaction between the first playing user and the second playing user comprises:
   monitoring for global events indicative of social interaction between the first playing user and the second playing user outside a game environment of the game.

6. The method of claim 1, wherein the condition comprises an identification of a shared objective with respect to gameplay of the game, and wherein the shared objective is shared between the first playing user and the second playing user.

7. The method of claim 1, wherein the condition is specific to the game and identifies the first social interaction that is specific to the game and not available in other games hosted by the collaboration platform.

8. A method comprising:
   hosting, by a processing device, a game on a collaboration platform to allow a plurality of playing users to participate in gameplay of the game;
   identifying a condition of the game that is specified by a creating user of the game and identifies first social interaction criteria for the plurality of playing users, wherein satisfaction of the first social interaction criteria of the condition qualifies at least one of the plurality of playing users to receive a friend request;
   determining that a first social interaction between a first playing user and a second playing user of the plurality of playing users playing the game satisfies the first social interaction criteria of the condition of the game;
   responsive to determining that the first social interaction satisfies the first social interaction criteria of the condition, sending the friend request to a first client device of the first playing user inviting the first playing user to establish a friendship with the second playing user on the collaboration platform; and
   responsive to identifying the condition of the game specified by the creating user, monitoring for events indicative of the first social interaction between the first playing user and the second playing user, wherein monitoring for the events indicative of the first social interaction between the first playing user and the second playing user comprises:
   monitoring a game environment associated with the game for in-game events indicative of social interaction between the first playing user and the second playing user within the game environment.

9. A method comprising:
   hosting, by a processing device, a game on a collaboration platform to allow a plurality of playing users to participate in gameplay of the game;
   identifying a condition of the game that is specified by a creating user of the game and identifies first social interaction criteria for the plurality of playing users, wherein satisfaction of the first social interaction criteria of the condition qualifies at least one of the plurality of playing users to receive a friend request;
   determining that a first social interaction between a first playing user and a second playing user of the plurality of playing users playing the game satisfies the first social interaction criteria of the condition of the game; and responsive to determining that the first social interaction satisfies the first social interaction criteria of the condition, sending the friend request to a first client device of the first playing user inviting the first playing user to establish a friendship with the second playing user on the collaboration platform, wherein the condition comprises a proximity of a first character associated with the first playing user and a second character associated the second playing user within a game environment of the game during the gameplay.

10. A method comprising:

hosting, by a processing device, a game on a collaboration platform to allow a plurality of playing users to participate in gameplay of the game;

identifying a condition of the game that is specified by a creating user of the game and identifies first social interaction criteria for the plurality of playing users, wherein satisfaction of the first social interaction criteria of the condition qualifies at least one of the plurality of playing users to receive a friend request;

determining that a first social interaction between a first playing user and a second playing user of the plurality of playing users playing the game satisfies the first social interaction criteria of the condition of the game; and responsive to determining that the first social interaction satisfies the first social interaction criteria of the condition, sending the friend request to a first client device of the first playing user inviting the first playing user to establish a friendship with the second playing user on the collaboration platform, wherein the condition comprises messaging between the first playing user and the second playing user concurrent with the first playing user and second playing user participating in the gameplay of the game.

11. A method comprising:

hosting, by a processing device, a game on a collaboration platform to allow a plurality of playing users to participate in gameplay of the game;

identifying a condition of the game that is specified by a creating user of the game and identifies first social interaction criteria for the plurality of playing users, wherein satisfaction of the first social interaction criteria of the condition qualifies at least one of the plurality of playing users to receive a friend request;

determining that a first social interaction between a first playing user and a second playing user of the plurality of playing users playing the game satisfies the first social interaction criteria of the condition of the game;

responsive to determining that the first social interaction satisfies the first social interaction criteria of the condition, sending the friend request to a first client device of the first playing user inviting the first playing user to establish a friendship with the second playing user on the collaboration platform;

establishing the friendship via the collaboration platform between the first playing user and the second playing user based on the friend request;

subsequent to establishing the friendship between the first playing user and the second playing user, determining whether the friendship satisfies a quality friendship threshold; and responsive to determining that the friendship between the first playing user and the second playing user satisfies the quality friendship threshold, inserting a game identifier of the game into search results responsive to a search query on the collaboration platform.

12. The method of claim 11, wherein determining whether the friendship satisfies the quality friendship threshold comprises:

identifying a quality friendship condition that identifies second social interaction criteria for the first playing user and the second playing user;

monitoring second social interaction between the first playing user and the second playing user subsequent to establishing the friendship between the first playing user and the second playing user on the collaboration platform;

determining whether the second social interaction between the first playing user and the second playing user satisfies the quality friendship condition;

responsive to determining that the second social interaction between the first playing user and the second playing user satisfies the quality friendship condition, increasing a quality friendship score;

responsive to determining that the second social interaction between the first playing user and the second playing user does not satisfy the quality friendship condition, decreasing the quality friendship score; and determining whether the quality friendship score satisfies the quality friendship threshold, wherein the friendship satisfies the quality friendship threshold responsive to the quality friendship score exceeding the quality friendship threshold, and wherein the friendship does not satisfy quality friendship responsive to the quality friendship score being less than the quality friendship threshold.

13. The method of claim 12, wherein monitoring the second social interaction between the first playing user and the second playing user subsequent to establishing the friendship between the first playing user and the second playing user on the collaboration platform comprises:

monitoring for global events indicative of the second social interaction between the first playing user and the second playing user, the global events comprising social interaction between the first playing user and the second playing user within another game environment associated with another game of the collaboration platform.

14. The method of claim 12, wherein the second social interaction criteria of the quality friendship condition comprise a threshold number of times the first playing user and the second playing user engaged in a messaging conversation subsequent to establishing the friendship.

15. A system comprising:

a memory; and a processing device, coupled to the memory, the processing device to:

host a game on a collaboration platform to allow a plurality of playing users to participate in gameplay of the game;

identify a condition of the game that is specified by a creating user of the game and identifies first social interaction criteria for the plurality of playing users, wherein satisfaction of the first social interaction criteria of the condition qualifies at least one of the plurality of playing users to receive a friend request;

determine that a first social interaction between a first playing user and a second playing user of the plurality of playing users playing the game satisfies the first social interaction criteria of the condition of the game;

responsive to identifying the condition of the game specified by the creating user, monitor for events indicative of the first social interaction between the first playing user and the second playing user, wherein to monitor for the events indicative of the first social interaction between the first playing user and the second playing user comprises:

monitor a game environment associated with the game for in-game events indicative of social interaction between the first playing user and the second playing user within the game environment; and responsive to determining that the first social interaction satisfies the first social interaction criteria of the condition, send the friend request to a first client device of the first playing user inviting the first playing user to establish a friendship with the second playing user on the collaboration platform.

16. A non-transitory computer-readable medium comprising instructions that, responsive to execution by a processing device, cause the processing device to perform operations comprising:

hosting, by the processing device, a game on a collaboration platform to allow a plurality of playing users to participate in gameplay of the game;

identifying a condition of the game that is specified by a creating user of the game and identifies first social interaction criteria for the plurality of playing users, wherein satisfaction of the first social interaction criteria of the condition qualifies at least one of the plurality of playing users to receive a friend request;

determining that a first social interaction between a first playing user and a second playing user of the plurality of playing users playing the game satisfies the first social interaction criteria of the condition of the game; and responsive to determining that the first social interaction satisfies the first social interaction criteria of the condition, sending the friend request to a first client device of the first playing user inviting the first playing user to establish a friendship with the second playing user on the collaboration platform, wherein the condition comprises:

one or more of messaging between the first playing user and the second playing user concurrent with the first playing user and second playing user participating in the gameplay of the game, or a proximity of a first character associated with the first playing user and a second character associated the second playing user within a game environment of the game during the gameplay.

17. The non-transitory computer-readable medium of claim 16, the operations further comprising:

providing, to a third client device of the creating user, a developer interface of the collaboration platform to allow the creating user to create a game specification for the game and to specify the condition that identifies the first social interaction criteria; and receiving the game specification created by the creating user using the developer interface of the collaboration platform and the condition specified by the creating user.

18. A method comprising:

providing, by a processing device, a game for gameplay, wherein game is accessible by a plurality of playing users via a collaboration platform, wherein the game is associated with a condition that identifies first social interaction criteria for the plurality of playing users playing the game, and wherein satisfaction of the condition qualifies at least one of the plurality of playing users to receive a friend request;

monitoring for an event identifier indicative of a first social interaction between a first playing user and a second playing user of the plurality of playing users that are participating in the gameplay of the game, wherein monitoring for the event identifier indicative of the first social interaction between the first playing user and the second playing user of the plurality of playing users that are participating in the gameplay of the game comprises one or more of:

monitoring a game environment associated with the game for an identifier of an in-game event indicative of social interaction between the first playing user and the second playing user within the game environment;

determining, based on the event identifier, that the first social interaction between the first playing user and the second playing user satisfies the first social interaction criteria identified by the condition; and causing the friend request to be sent to a first client device of the first playing user inviting the first playing user to establish a friendship with the second playing user on the collaboration platform.

19. The method of claim 18, wherein the in-game event comprises a proximity of a first character associated with the first playing user and a second character associated with the second playing user within the game environment of the game.

20. The method of claim 18, wherein monitoring for the event identifier indicative of the first social interaction between the first playing user and the second playing user of the plurality of playing users that are participating in the gameplay of the game comprises:

receiving, from the collaboration platform, an identifier of a global event indicative of social interaction between the first playing user and the second playing user outside a game environment of the game and on the collaboration platform.

21. The method of claim 20, wherein the global event comprises messaging between the first playing user and the second playing user concurrent with the first playing user and second playing user participating in the gameplay of the game.

22. The method of claim 18, further comprising:

providing, to a third client device of the creating user, a developer interface of the collaboration platform to allow the creating user to create a game specification for the game and to specify the condition that identifies the first social interaction criteria; and receiving the game specification created by the creating user using the developer interface of the collaboration platform and the condition specified by the creating user.

23. The method of claim 18, further comprising:

establishing the friendship via the collaboration platform between the first playing user and the second playing user based on the friend request;

subsequent to establishing the friendship between the first playing user and the second playing user, determining whether the friendship satisfies a quality friendship threshold; and responsive to determining that the friendship between the first playing user and the second playing user satisfies the quality friendship threshold, inserting a game identifier of the game into search results responsive to a search query on the collaboration platform.

24. The method of claim 23, wherein determining whether the friendship satisfies the quality friendship threshold comprises:

identifying a quality friendship condition that identifies second social interaction criteria for the first playing user and the second playing user;

monitoring second social interaction between the first playing user and the second playing user subsequent to establishing the friendship between the first playing user and the second playing user on the collaboration platform; and determining whether the second social interaction between the first playing user and the second playing user satisfies the quality friendship condition;

responsive to determining that the second social interaction between the first playing user and the second playing user satisfies the quality friendship condition, increasing a quality friendship score;

responsive to determining that the second social interaction between the first playing user and the second playing user does not satisfy the quality friendship condition, decreasing the quality friendship score; and determining whether the quality friendship score satisfies the quality friendship threshold, wherein the friendship satisfies the quality friendship threshold responsive to the quality friendship score exceeding the quality friendship threshold, and wherein the friendship does not satisfy quality friendship responsive to the quality friendship score being less than the quality friendship threshold.

25. The method of claim 24, wherein monitoring the second social interaction between the first playing user and the second playing user subsequent to establishing the friendship between the first playing user and the second playing user on the collaboration platform comprises:

monitoring for global events indicative of the second social interaction between the first playing user and the second playing user, the global events comprising social interaction between the first playing user and the second playing user within another game environment associated with another game of the collaboration platform.

* * * * *